US012732721B2

(12) United States Patent
Yoon

(10) Patent No.: US 12,732,721 B2
(45) Date of Patent: Sep. 8, 2026

(54) VERTICALLY STACKED TYPE IMAGE SENSORS AND ELECTRONIC DEVICES INCLUDING THE SAME

(71) Applicant: SAMSUNG ELECTRONICS CO., LTD., Suwon-si (KR)

(72) Inventor: Youngzoon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 18/224,320

(22) Filed: Jul. 20, 2023

(65) Prior Publication Data

US 2024/0155269 A1 May 9, 2024

(30) Foreign Application Priority Data

Nov. 8, 2022 (KR) ........................ 10-2022-0148194

(51) Int. Cl.

*H04N 25/79* (2023.01)
*G02B 13/00* (2006.01)
*H04N 25/17* (2023.01)
*H04N 25/702* (2023.01)

(52) U.S. Cl.

CPC ......... *H04N 25/79* (2023.01); *G02B 13/0055* (2013.01); *H04N 25/17* (2023.01); *H04N 25/702* (2023.01)

(58) Field of Classification Search

CPC ...... H04N 25/79; H04N 25/17; H04N 25/702; G02B 13/0055; H10F 39/12; H10F 39/8053; H10F 39/802; H10F 39/811

See application file for complete search history.

(56) References Cited

U.S. PATENT DOCUMENTS

| | | | | |
|---|---|---|---|---|
| 6,727,521 | B2 | 4/2004 | Merrill | |
| 6,841,816 | B2 | 1/2005 | Merrill et al. | |
| 7,132,724 | B1 | 11/2006 | Merrill | |
| 8,384,007 | B2 | 2/2013 | Yu et al. | |
| 9,000,353 | B2 | 4/2015 | Seo et al. | |
| 9,349,763 | B1 * | 5/2016 | Lin | H10F 39/199 |
| 9,837,414 | B1 | 12/2017 | Balakrishnan et al. | |
| 2009/0152664 | A1 * | 6/2009 | Klem | G06V 40/1318 257/466 |
| 2012/0193689 | A1 * | 8/2012 | Park | H10F 39/192 257/E31.083 |
| 2015/0214261 | A1 | 7/2015 | Park et al. | |

(Continued)

FOREIGN PATENT DOCUMENTS

| | | | |
|---|---|---|---|
| CN | 111180476 | * | 5/2020 |
| CN | 114353942 | A | 4/2022 |

(Continued)

OTHER PUBLICATIONS

Communication issued on Jun. 19, 2026 by the Korean Ministry of Intellectual Property (MOIP) in Korean Patent Application No. 10-2022-0148194.

*Primary Examiner* — Albert H Cutler

(74) *Attorney, Agent, or Firm* — Sughrue Mion, PLLC

(57) ABSTRACT

Provided is a vertically stacked type image sensor including a plurality of pixels, each of the plurality of pixels including a plurality of sub-pixels stacked vertically, wherein the plurality of sub-pixels have a layer structure that is configured to generate an absorption resonance at different wavelengths of light.

18 Claims, 43 Drawing Sheets
(32 of 43 Drawing Sheet(s) Filed in Color)

(56) References Cited

U.S. PATENT DOCUMENTS

| | | | | |
|---|---|---|---|---|
| 2017/0084761 | A1 | 3/2017 | Cho et al. | |
| 2022/0115420 | A1 | 4/2022 | Yoon | |
| 2024/0014230 | A1* | 1/2024 | Ono | H10F 39/80373 |
| 2024/0094447 | A1* | 3/2024 | Motokubota | H10F 39/8053 |
| 2024/0145508 | A1* | 5/2024 | Liu | H10F 39/12 |

FOREIGN PATENT DOCUMENTS

| | | | |
|---|---|---|---|
| EP | 3985366 | A2 | 4/2022 |
| JP | 2022-101950 | A | 7/2022 |
| JP | 2022-124066 | A | 8/2022 |
| KR | 10-2017-0033734 | A | 3/2017 |

* cited by examiner

FIG. 14C
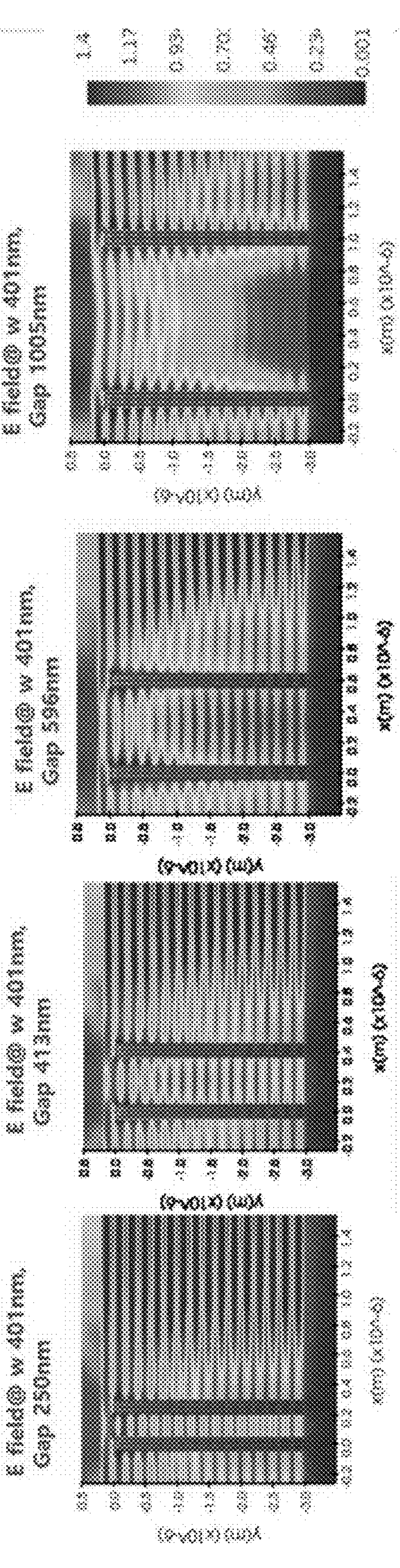

Si NW Absorption (%)
in SiO2
NW R=59 nm
NW R=85 nm
NW R=108 nm
15B1
15B2
15B3
A (%)
40
35
30
25
20
15
10
5
0
400
450
500
550
600
650
700
750
800
lambda (nm)

FIG. 15C

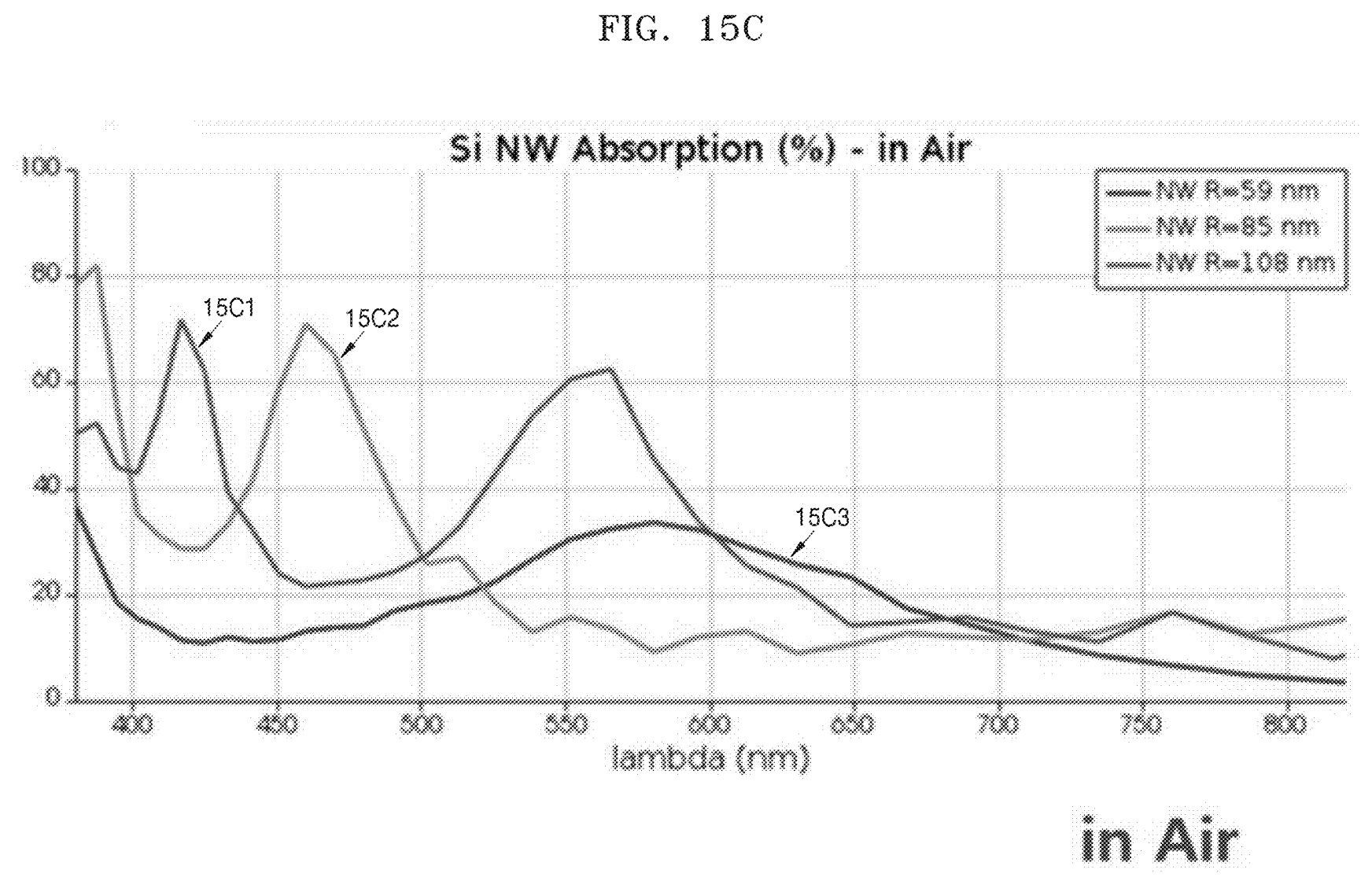

Si NW Absorption (%) - in Air

NW R=59 nm
NW R=85 nm
NW R=109 nm

15C1
15C2
15C3

0
20
40
60
80
100

400
450
500
550
600
650
700
750
800 lambda (nm)

in Air

VERTICALLY STACKED TYPE IMAGE SENSORS AND ELECTRONIC DEVICES INCLUDING THE SAME

CROSS-REFERENCE TO RELATED APPLICATION

This application claims priority to Korean Patent Application No. 10-2022-0148194, filed on Nov. 8, 2022, in the Korean Intellectual Property Office, the disclosure of which is incorporated by reference herein in its entirety.

BACKGROUND

1. Field

Example embodiments of the present disclosure relate to image sensors, and more particularly, to vertically stacked type image sensors including a pixel having a vertically stacked layer structure and electronic devices including the vertically stacked type image sensors.

2. Description of Related Art

An image sensor has a structure in which an organic color filter is mounted on an upper surface of a photodiode. Incident light may be separated into red light (R), green light (G), and blue light (B) by a color filter. In an RGB image sensor, color filters may be arranged in a mosaic form.

It may be difficult to overcome a pixel size limitation by a method of flatly arranging color filters in a mosaic form. Accordingly, with this method, it may be difficult to achieve high integration of an image sensor.

Accordingly, a vertically stacked type image sensor has been introduced as one of technologies capable of overcoming the pixel size limitation. A vertically stacked type image sensor may utilize the property that silicon has different thickness transmission characteristics for each wavelength.

SUMMARY

One or more example embodiments provide vertically stacked type image sensors configured to enhance a wavelength separation effect.

One or more example embodiments provide vertically stacked type image sensors configured to increase the degree of integration.

One or more example embodiments provide vertically stacked type image sensors that extends to a hyperspectral imaging area.

One or more example embodiments provide electronic devices including the vertically stacked type image sensors.

Additional aspects will be set forth in part in the description which follows and, in part, will be apparent from the description, or may be learned by practice of the example embodiments of the disclosure.

According to an aspect of an example embodiment, there is provided a vertically stacked type image sensor including a plurality of pixels, each of the plurality of pixels including a plurality of sub-pixels stacked vertically, wherein the plurality of sub-pixels have a layer structure that is configured to generate an absorption resonance at different wavelengths of light.

The plurality of sub-pixels may have different diameters from each other.

The plurality of sub-pixels may include a red sub-pixel configured to generate an absorption resonance with respect to a wavelength of red light, a green sub-pixel configured to generate an absorption resonance with respect to a wavelength of green light, and a blue sub-pixel configured to generate an absorption resonance with respect to a wavelength of blue light, wherein the red sub-pixel, the green sub-pixel, and the blue sub-pixel are sequentially vertically stacked, and wherein a width of the red sub-pixel is greater than a width of the green sub-pixel, and the width of the green sub-pixel is greater than a width of the blue sub-pixel.

The plurality of sub-pixels may be stacked to form the layer structure in which diameters of the plurality of sub-pixels decrease vertically upward.

Heights of some sub-pixels of the plurality of sub-pixels may be different from heights of the remaining sub-pixels of the plurality of sub-pixels.

Two adjacent pixels among the plurality of pixels may be inclined toward each other.

Each sub-pixel of the plurality of sub-pixels may include a P-type semiconductor layer and an N-type semiconductor layer vertically stacked.

The vertically stacked type image sensor may further include a first electrode wiring connected to the P-type semiconductor layer and a second electrode wiring connected to the N-type semiconductor layer.

The vertically stacked type image sensor may further include an insulating layer provided adjacent to the plurality of sub-pixels.

When a height of a sub-pixel among the plurality of sub-pixels and a height of the insulating layer increase, light absorptivity of the sub-pixel may increase.

The plurality of pixels may be provided on a plane.

Two adjacent pixels among the plurality of pixels may be spaced apart by a first distance at which absorption resonances of the plurality of sub-pixels included in the two adjacent pixels is maintained.

The plurality of pixels may be provided on a curved surface.

The curved surface may be a Petzval surface.

The plurality of sub-pixels may include four or more sub-pixels.

A number of sub-pixels included in the plurality of sub-pixels may correspond to a number of sub-pixels required to obtain a hyperspectral image.

According to another aspect of an example embodiment, there is provided an electronic device including a vertically stacked type image sensor including a plurality of pixels, each of the plurality of pixels including a plurality of sub-pixels stacked vertically, wherein the plurality of sub-pixels have a layer structure that is configured to generate an absorption resonance at different wavelengths of light.

The plurality of sub-pixels may have different diameters from each other.

The plurality of sub-pixels may include a red sub-pixel configured to generate an absorption resonance with respect to a wavelength of red light, a green sub-pixel configured to generate an absorption resonance with respect to a wavelength of green light, and a blue sub-pixel configured to generate an absorption resonance with respect to a wavelength of blue light, wherein the red sub-pixel, the green sub-pixel, and the blue sub-pixel are sequentially vertically stacked, and wherein a width of the red sub-pixel is greater than a width of the green sub-pixel, and the width of the green sub-pixel is greater than a width of the blue sub-pixel.

The plurality of sub-pixels may be stacked to form the layer structure in which diameters of the plurality of sub-pixels decrease vertically upward.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The above and other aspects, features, and advantages of example embodiments of the disclosure will be more apparent from the following description taken in conjunction with the accompanying drawings, in which:

FIGS. 9A, 9B, 9C, 9D, 10A, 10B, 10C, 10D, 11A, 11B, 11C, 11D, 12A, 12B, 12C, 12D, 13A, 13B, 13C, 14A, 14B, 14C, 15A, 15B, and 15C are graphs and images showing simulation results performed to examine a change in light absorptivity according to various conditions of a pixel of a vertically stacked type image sensor according to an example embodiment;

DETAILED DESCRIPTION

Figure 1:
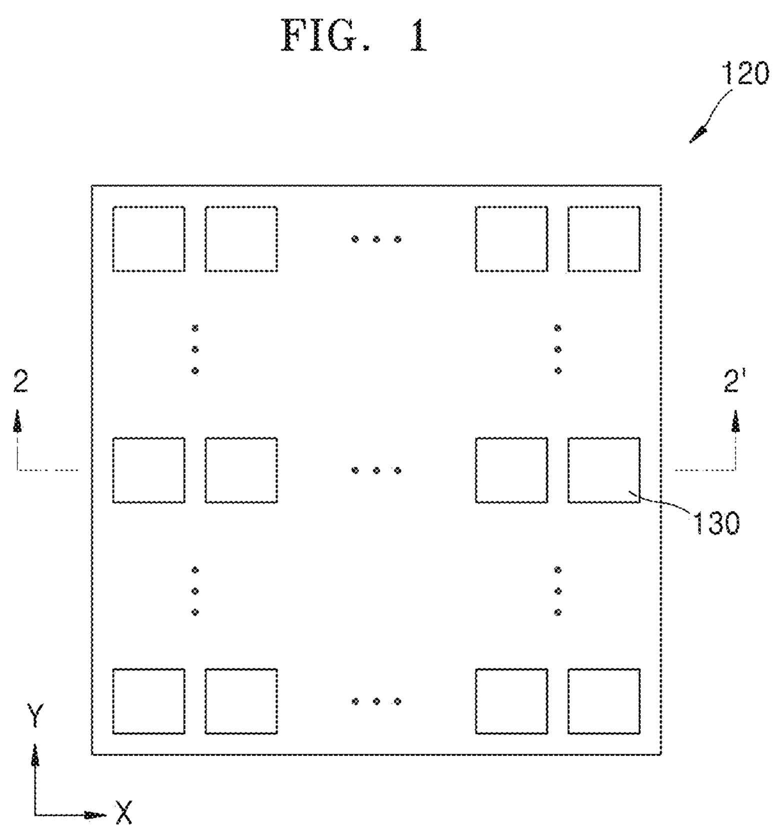
FIG. 1 is a plan view of a vertically stacked type image sensor on which pixels are arranged on a pixel array surface, according to an example embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term “and/or” includes any and all combinations of one or more of the associated listed items. Expressions such as “at least one of,” when preceding a list of elements, modify the entire list of elements and do not modify the individual elements of the list. For example, the expression, “at least one of a, b, and c,” should be understood as including only a, only b, only c, both a and b, both a and c, both b and c, or all of a, b, and c.

Hereinafter, a vertically stacked type image sensor and an electronic device according to an example embodiment will be described in detail with reference to the accompanying drawings.

The drawings are not to scale, and thicknesses of layers and regions may be exaggerated for clarification of the specification. The embodiments of the disclosure may be variously modified and may be embodied in many different forms. In addition, when an element or layer is referred to as being “on” or “above” another element or layer, the element or layer may be directly on another element or layer or intervening elements or layers. In the descriptions below, like reference numerals in each drawing indicate like elements.

FIG. 1 is a plan view of a surface, on which light is incident, that is, a surface (a pixel array surface) on which pixels are aligned, of a vertically stacked type image sensor 120 according to an example embodiment.

Referring to FIG. 1, the vertically stacked type image sensor 120 includes a plurality of pixels 130, and the plurality of pixels 130 are arranged in a given shape. For example, the plurality of pixels 130 may be arranged to form an array. For example, the plurality of pixels 130 may be arranged at intervals set in directions perpendicular to each other or substantially perpendicular to each other.

Figure 2:
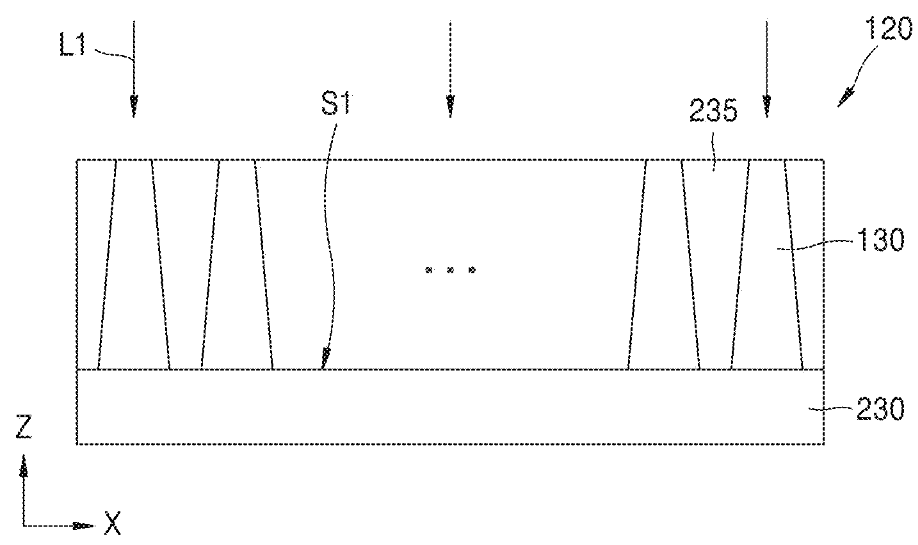
FIGS. 2 and 3 are cross-sectional views of the vertically stacked type image sensor taken along line 2-2' of FIG. 1.

FIG. 2 shows a cross-sectional view taken along line 2-2' of FIG. 1.

Referring to FIG. 2, the plurality of pixels 130 are disposed on a surface S1 of a first substrate 230, and an insulating layer 235 is filled between the plurality of pixels 130. The first substrate 230 may be generally flat and have a uniform thickness. The entire surface S1 of the first substrate 230 may be a flat surface. For example, the entire surface S1 may be parallel or substantially parallel to a plane (X-Y plane) formed by X and Y axes. The plurality of pixels 130 may have the same height or substantially the same height in a direction perpendicular or substantially perpendicular to the first substrate 230, that is, in a Z-axis direction. The plurality of pixels 130 are aligned in the first direction (e.g., an X-axis direction). The first direction may be a direction parallel to the first substrate 230. The insulating layer 235 may be completely filled between the pixels 130 and may completely surround a circumference of each pixel 130. A height (thickness) of the insulating layer 235 in the Z-axis direction may be the same as or substantially the same as the height of each pixel 130. Here, the expression “substantially the same” may be interpreted as being considered the same when differences that may inevitably or unintentionally occur during a manufacturing process are within an allowed error range or set range. The insulating layer 235 may be a material layer that is transparent to light L1 incident on the vertically stacked type image sensor 120 or may include a material layer that is transparent to light L1. For example, the insulating layer 235 may be a silicon oxide (e.g., $SiO_2$) layer or include such a silicon oxide layer.

For example, a width of an upper end of each pixel 130 into which light L1 is incident may be less than a width of a lower end of each pixel 130, but embodiments are not limited thereto. For example, each pixel 130 may include a layer structure in which the width varies from top to bottom in the Z-axis direction, that is, a layer structure in which the width changes according to height. The layer structure may be a layer structure in which the width of each pixel 130 continuously changes from the top to the bottom, or may be a layer structure in which the width of each pixel 130 changes discontinuously, but embodiments are not limited thereto. For example, the entire layer between the top and bottom of each pixel 130 may have the layer structure, or only a partial section of the entire layer between the top and bottom of each pixel 130 may have the layer structure, but embodiments are not limited thereto. For example, each pixel 130 may have the layer structure in a section corresponding to ⅓ or ½ of the total height, and the rest may have a layer structure different from the layer structure corresponding to ⅓ or ½ of the total height (e.g., a layer structure with a constant width). An example of the layer structure of each pixel 130 will be described later.

The upper and lower widths of each pixel 130 may range from several nanometers (nm) to several tens of nanometers or hundreds of nanometers. Accordingly, each pixel 130 may be expressed as a nanorod or nanowire. As described later, each pixel 130 may include a plurality of nanorods having different widths or may have a nanowire shape including a plurality of nanorods having different widths.

Light L1 incident on each pixel 130 may include a plurality of wavelength components. For example, the light L1 may be visible light or include visible light, or may be natural light.

Because the width of each pixel 130 is as narrow as a nanometer, the light L1 incident on each pixel 130 may be condensed and resonated for each wavelength while passing through each pixel 130. This resonance is affected by the width of each pixel 130. Accordingly, because only a specific wavelength of the light L1 is resonated in an absorption mode in a region having a specific width of each pixel 130, the absorptivity with respect to the specific wavelength is increased in the specific width of each pixel 130. For example, a first wavelength component of the light L1 may cause resonance in an absorption mode in an area having a first width of each pixel 130, and thus the first wavelength component in the area having the first width may be absorbed. Accordingly, the light L1 incident on each pixel 130 may be separated according to wavelength and absorbed while being transmitted from the upper end to the lower end of each pixel 130. Because light absorption in each pixel 130 is based on a resonance mode for each wavelength, the absorptivity may be higher than in a case depending on the transmission characteristics that are not based on resonance. For example, wavelength separation is performed in each pixel 130 according to resonance for each wavelength, and thus light absorptivity may be increased, and consequently, light efficiency of the vertically stacked type image sensor 120 may be increased.

Because the resonance occurring in each pixel 130 leads to light absorption, it may be expressed as light absorption resonance. For example, the first wavelength component may belong to red light (R), green light (G), or blue light (B), and may be a wavelength belonging between red light and green light or between green light and blue light. Each pixel 130 may include a material layer that is transparent to the incident light L1. For example, the transparent material layer may include silicon, but is not limited thereto.

For example, the first substrate 230 may include a circuit unit (e.g., a readout integrated circuit (IC)) for operating the vertically stacked type image sensor 120. For example, the first substrate 230 may include a circuit unit related to the operation of the vertically stacked type image sensor 120. For example, the circuit unit may include a circuit configured to apply a voltage to each pixel 130 or a circuit configured to generate an electrical signal for image generation based on a current generated in each pixel 130 according to photoelectric conversion.

Figure 3:
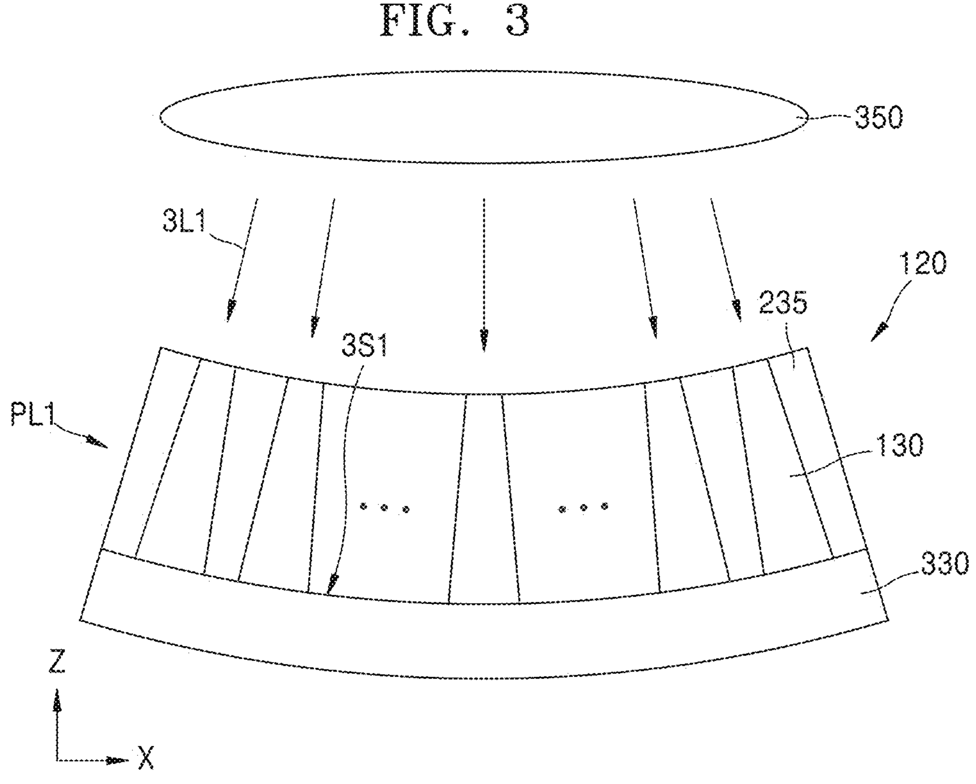

FIG. 3 shows an example different from FIG. 2 with respect to the cross-sectional view taken along line 2-2' of FIG. 1. Only parts different from those in FIG. 2 will be described.

Referring to FIG. 3, a plurality of pixels 130 are disposed on a surface 3S1 of a second substrate 330. An insulating layer 235 may be filled between the plurality of pixels 130. The surface 3S1 of the second substrate 330 may be non-planar. For example, the whole surface 3S1 of the second substrate 330 may be a curved surface. The plurality of pixels 130 may be arranged to form an array on the surface 3S1 which is a curved surface. The plurality of pixels 130 may be expressed as a pixel layer PL1 formed on the surface 3S1 of the second substrate 330. For example, the pixel layer PL1 may include the insulating layer 235. Heights of the plurality of pixels 130 disposed along the surface 3S1 may be the same as described in FIG. 2, and the height of the insulating layer 235 may be the same as that of the plurality of pixels 130. Accordingly, an upper surface of the pixel layer PL1, for example, a surface including an upper surface of each pixel 130 and an upper surface of the insulating layer 235 may be a curved surface. For example, the curvature of the upper surface of the pixel layer PL1 may be the same as or substantially the same as the curvature of the surface 3S1 of the second substrate 330. For example, a lens 350 may further be provided on the pixel layer PL1. For example, the lens 350 may include a single lens or may include two or more lenses. The surface 3S1 of the second substrate 330 may be a surface corresponding to a Petzval surface of the lens 350 or a surface having a Petzval surface shape. For example, the second substrate 330 and the lens 350 may be disposed so that the surface 3S1 of the second substrate 330 is positioned on the Petzval surface of the lens 350.

Because the surface 3S1 of the second substrate 330 may have a curved surface corresponding to the Petzval surface, the light 3L1 incident through the lens 350 is perpendicular to each pixel 130 or is substantially perpendicular to each pixel 130. Accordingly, the separation effect for each wavelength in each pixel 130 may further be increased.

In FIG. 3, the bottom of the second substrate 330 is also shown as a curved surface, embodiments are not limited thereto. For example, the bottom of the second substrate 330 may be a flat surface as a whole.

Figure 4:
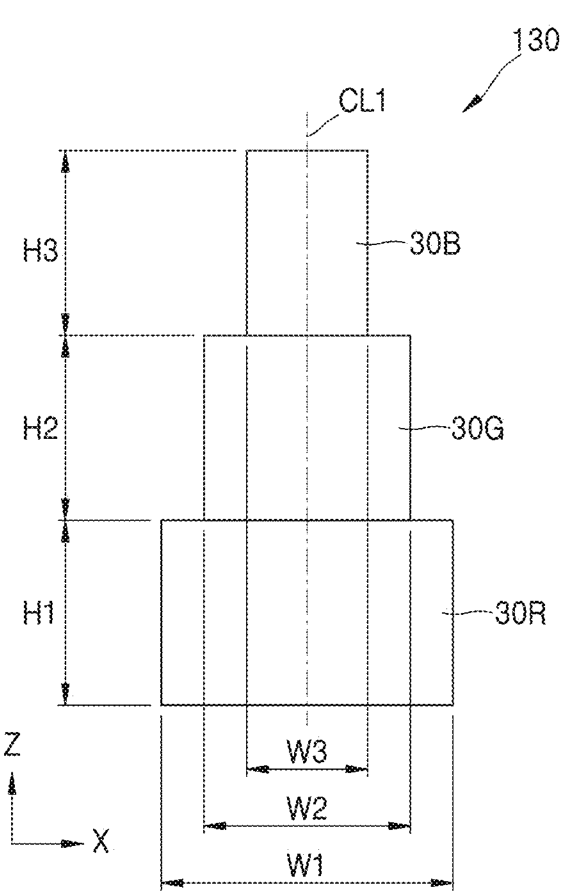
FIG. 4 is a cross-sectional view illustrating pixels forming a pixel array of the vertically stacked type image sensor of FIG. 1 in more detail.

FIG. 4 shows an example of the pixel 130 of FIGS. 1 to 3.

Referring to FIG. 4, the pixel 130 includes a first sub-pixel 30R, a second sub-pixel 30G, and a third sub-pixel 30B vertically stacked in a second direction (e.g., a Z-axis direction) perpendicular to the first direction. The first to third sub-pixels 30R, 30G, and 30B are sequentially stacked. The first to third sub-pixels 30R, 30G, and 30B may be expressed as a first material layer, a second material layer, and a third material layer. The first sub-pixel 30R may directly contact the surfaces S1 of the first substrate 230 and 3S1 of the second substrate 330. The first sub-pixel 30G may have a first width W1 in a first direction (e.g., the X-axis direction) and may have a first height H1 in the second direction (Z-axis direction). The first height H1 may be expressed as a first thickness. The second sub-pixel 30G formed on an upper surface of the first sub-pixel 30R may have a second width W2 in the first direction and a second height H2 in the second direction. The second width W2 may be less than the first width W1. The first and second heights H1 and H2 may be equal to or substantially equal to each other, but may also be different from each other.

Reference numeral CL1 denotes a vertical center line of the pixel 130. Similar to the first sub-pixel 30R, the horizontal center of the second sub-pixel 30G is on the vertical center line CL1. Accordingly, the first sub-pixel 30R may be left-right symmetric with respect to the vertical center line CL1. The second sub-pixel 30G may also be left-right symmetric with respect to the vertical center line CL1. The third sub-pixel 30B is provided on an upper surface of the second sub-pixel 30G, has a third width W3 in the first direction, and has a third height H3 in the second direction. The third width W3 may be less than the second width W2. The third height H3 may be the same or substantially the same as the second height H2, but may be different from each other. The horizontal center of the third sub-pixel 30B is also located on the vertical center line CL1. Accordingly, the third sub-pixel 30B may also be left-right symmetric with respect to the vertical center line CL1. For example, the first to third heights H1 to H3 may be equal to or substantially equal to each other, but may be different from each other.

For example, the third width W3 of the third sub-pixel 30B having the least width among the first to third sub-pixels 30R, 30G, and 30B may include a width configured to generate absorption resonance with respect to light of a first wavelength or light having a central wavelength of a first wavelength. For example, the second sub-pixel 30G may include a width configured to generate absorption resonance for light of a second wavelength or light having a central wavelength of a second wavelength. For example, the first sub-pixel 30R may include a width configured to generate absorption resonance for light of a third wavelength or light having a central wavelength of a third wavelength. For example, the first to third wavelengths may be different from each other. For example, among the three wavelengths, the first wavelength may be the shortest, the third wavelength may be the longest, and the second wavelength may be longer than the first wavelength and shorter than the third wavelength. For example, the first wavelength may belong to a blue light region of visible light, the second wavelength may belong to a green light region of visible light, and the third wavelength may be visible light that may pass through the third and second sub-pixels 30B and 30G in order and reach the first sub-pixel 30R at the bottom of the pixel 130, for example, may belong to red light.

For example, a rate at which the width decreases (narrows) from the first sub-pixel 30R to the third sub-pixel 30B may be constant or substantially constant, but may not be constant. For example, when the height changes from the first sub-pixel 30R to the third sub-pixel 30B or vice versa, a height increase/decrease ratio may be constant or substantially constant, or may not be constant.

Figure 5:
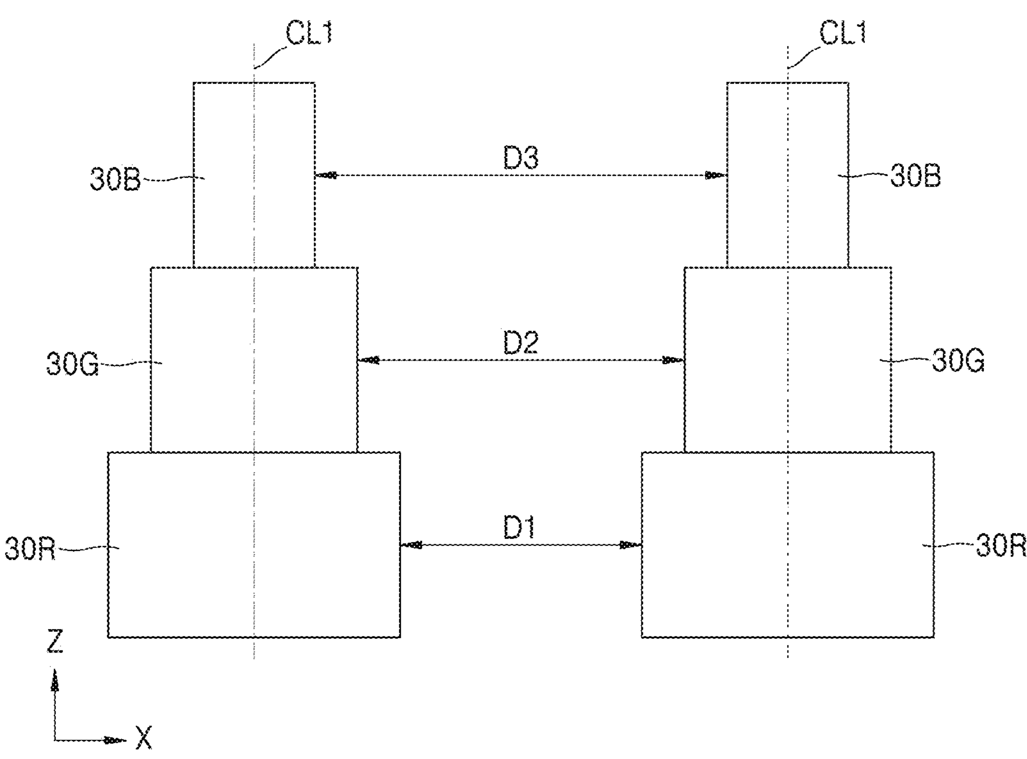
FIG. 5 is a cross-sectional view illustrating two adjacent pixels in the vertically stacked type image sensor having the cross-section of FIG. 2.

FIG. 5 shows two pixels disposed adjacent to each other on the surface S1 of the first substrate 230 that is flat shown in FIG. 2 when the pixel 130 has the layer structure shown in FIG. 4.

Referring to FIG. 5, the first sub-pixel 30R of two adjacent pixels is spaced apart by a first distance D1, the second sub-pixel 30G is spaced apart by a second distance D2, and the third sub-pixel 30B is spaced apart by a third distance D3. For example, the second distance D2 may be greater than the first distance D1, and the third distance D3 may be greater than the second distance D2. The first to third distances D1, D2, and D3 may be measured based on the vertical center line CL1 of each pixel. Although described later in a simulation result, the separation distance between two adjacent pixels 130 may affect light absorption (rate) of the pixel 130.

Figure 6:
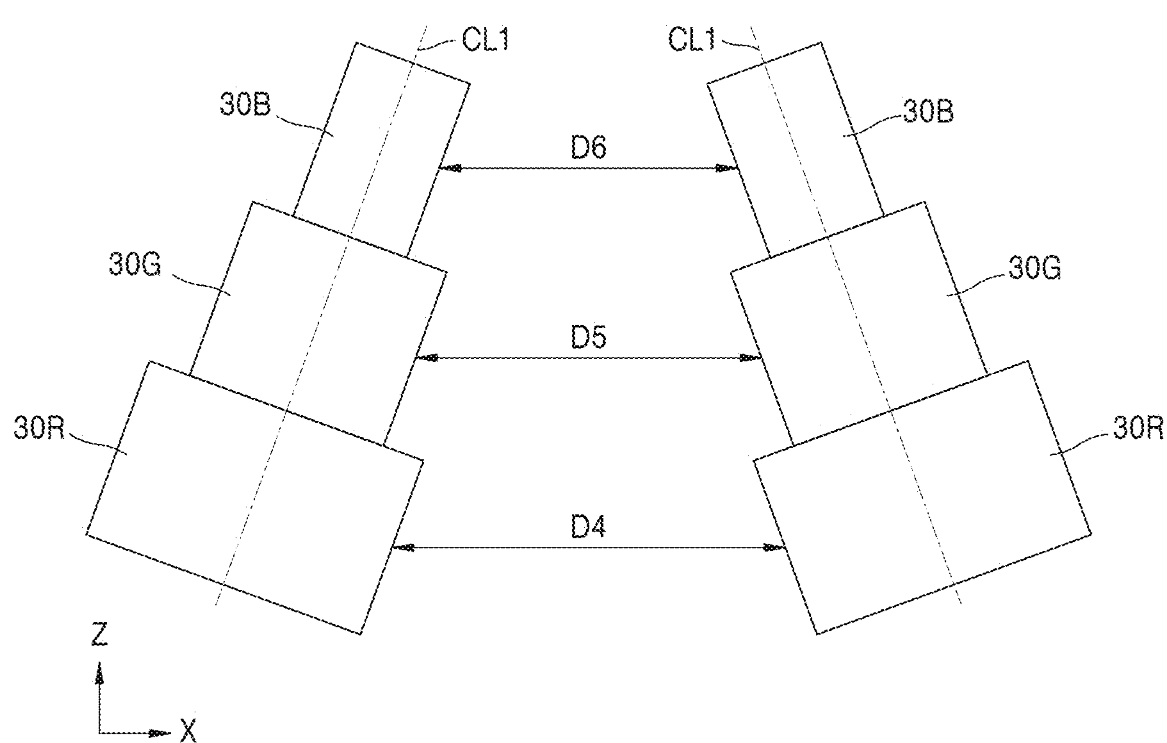
FIG. 6 is a cross-sectional view illustrating two adjacent pixels in the vertically stacked type image sensor having the cross-section of FIG. 3.

FIG. 6 shows two pixels disposed adjacent to each other on the curved surface 3S1 of the substrate 330 shown in FIG. 3 when the pixel 130 has the layer structure shown in FIG. 4.

Referring to FIG. 6, the first sub-pixel 30R of two adjacent pixels is spaced apart by a fourth distance D4, the second sub-pixel 30G is spaced apart by a fifth distance D5, and the third sub-pixel 30B is spaced apart by a sixth distance D6. For example, the fifth distance D5 may be less than the fourth distance D4, and the sixth distance D6 may be less than the fifth distance D5. The fourth to sixth distances D4, D5, and D6 may be measured based on the vertical center line CL1 of each pixel. Similarly, the separation distance between two adjacent pixels 130 may affect the light absorption (rate) of the pixel 130.

Figure 7:
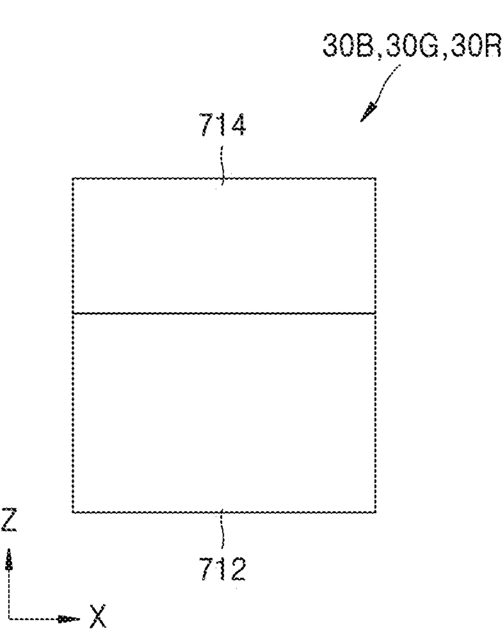
FIG. 7 is a cross-sectional view showing an example of a layer structure of each layer of a pixel illustrated in FIG. 4.

FIG. 7 shows a layer structure of sub-pixels 30R, 30G, and 30B when the pixel 130 has a layer structure including sequentially stacked sub-pixels 30R, 30G, and 30B as illustrated in FIG. 4.

Referring to FIG. 7, each of the sub-pixels 30R, 30G, and 30B may include a first layer 712 and a second layer 714 sequentially stacked. The first and second layers 712 and 714 may be in direct contact with each other. The first and second layers 712 and 714 are material layers of opposite types, one of which may be a P-type material layer and the other may be an N-type material layer. For example, the first layer 712 may be a silicon layer doped with an N-type impurity, and the second layer 714 may be a silicon layer doped with a P-type impurity, but is not limited thereto. For example, each of the sub-pixels 30R, 30G, and 30B may have a PN diode structure.

Figure 8:
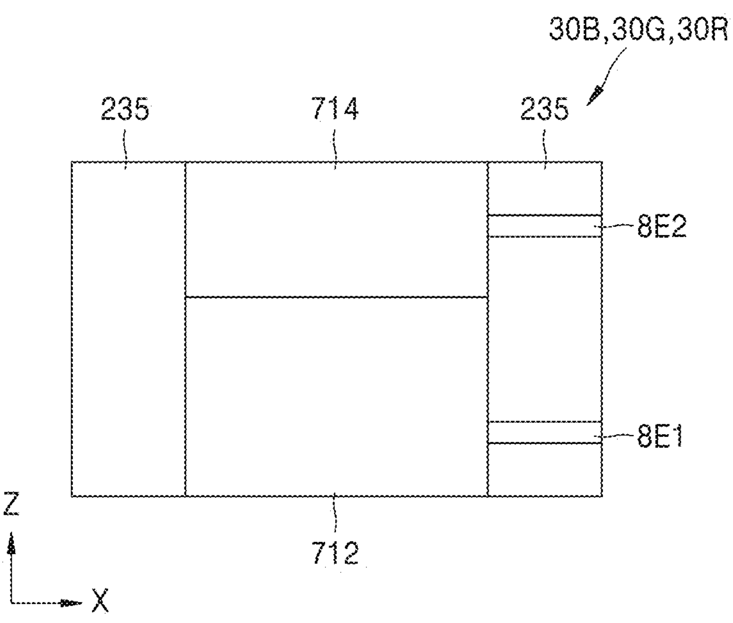
FIG. 8 is a cross-sectional view illustrating a case in which an insulating layer is provided around each layer of the pixel illustrated in FIG. 7.

Each of the sub-pixels 30R, 30G, and 30B shown in FIG. 7 may be surrounded by an insulating layer 235 as shown in FIG. 8.

Referring to FIG. 8, the insulating layer 235 may be provided adjacent to and completely surround each of the sub-pixels 30R, 30G, and 30B, and may directly contact the sub-pixels 30R, 30G, and 30B.

The insulating layer 235 includes first electrode wiring 8E1 and a second electrode wiring 8E2 sequentially stacked in a direction parallel to a side surface of each sub-pixel 30R, 30G, and 30B, for example, in a Z-axis direction. The first and second electrode wirings 8E1 and 8E2 are spaced apart from each other. The first electrode wiring 8E1 may be connected to the first layer 712 of each of the sub-pixels 30R, 30G, and 30B. The second electrode wiring 8E2 may be connected to the second layer 714 of each of the sub-pixels 30R, 30G, and 30B. The first and second electrode wirings 8E1 and 8E2 may be wirings for applying voltages to the sub-pixels 30R, 30G, and 30B, and may serve as a moving paths for a photoelectric conversion signal (e.g., photocurrent) generated in each of the sub-pixels 30R, 30G, and 30B. For example, a material of the first and second electrode wirings 8E1 and 8E2 may be a conductive transparent material layer or include such a transparent material layer. For example, the transparent material layer may be or include an indium tin oxide (ITO) layer, but is not limited thereto. The first and second electrode wirings 8E1 and 8E2 may be connected to electronic devices of the substrates 230 and 330.

FIGS. 9 to 16 show simulation results performed under various conditions to confirm the light absorption characteristics of the pixel 130.

First, FIGS. 9A, 9B, 9C, and 9D shows simulation results (hereinafter, a first simulation) performed to confirm a relationship between a radius and the light absorbance of the first to third sub-pixels 30R, 30G, and 30B.

In the first simulation, a material of the pixel 130 is set to silicon, a radius of the first sub-pixel 30R is 120 nm, a radius of the second sub-pixel 30G is 95 nm, and a radius of the third sub-pixel 30B is 70 nm.

In addition, the first simulation is performed by dividing the visible light incident on the pixel 130 into a first wavelength case, a second wavelength case, and a third wavelength case, and the first to third wavelengths are set to 612 nm, 490 nm, and 400 nm, respectively.

Figure 9A:
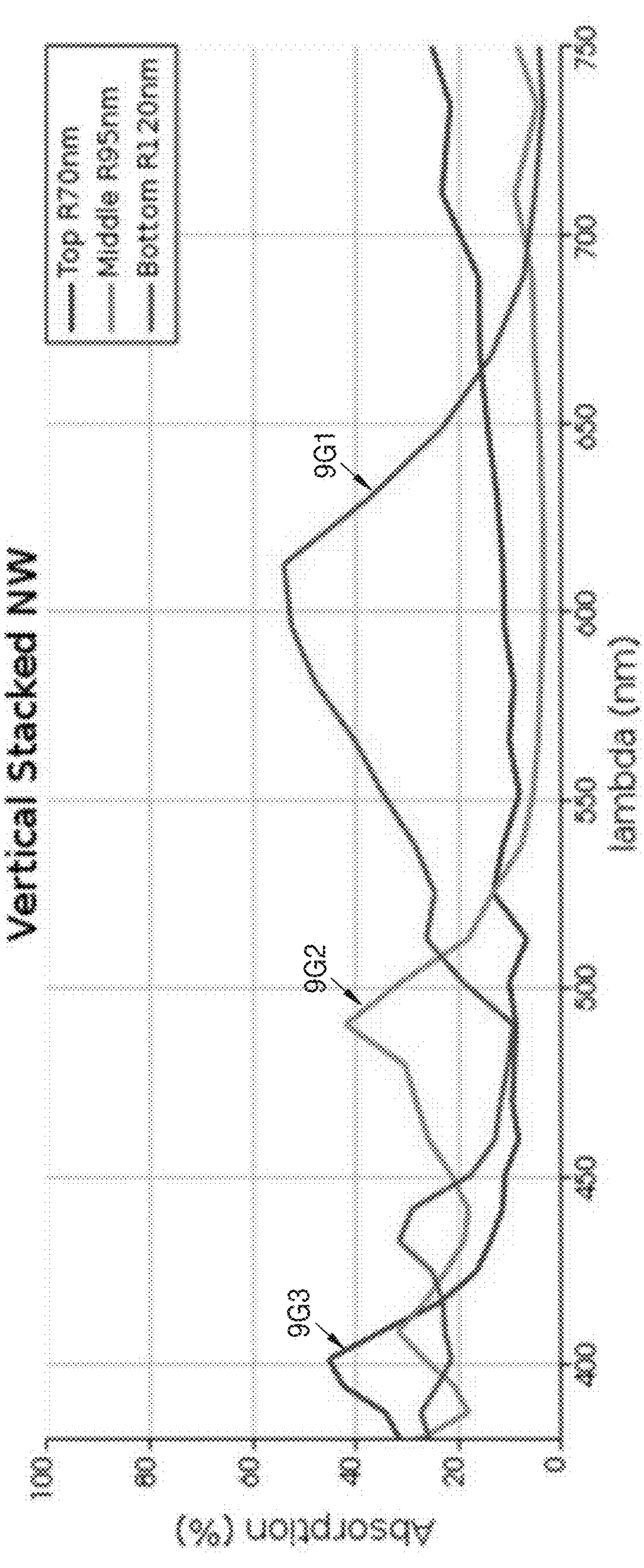

FIG. 9A is a graph showing a wavelength-light absorptivity relationship of the first to third sub-pixels 30R, 30G, and 30B having the radius condition. Regarding FIG. 9A, a first graph 9G1 shows a wavelength-light absorptivity relationship for the first sub-pixel 30R, a second graph 9G2 shows a wavelength-light absorptivity relationship for the second sub-pixel 30G, and a third graph 9G3 shows a wavelength-light absorptivity relationship for the third sub-pixel 30B. In the first simulation, the setting of the first to third wavelengths incident on the pixel 130 is based on the wavelength-light absorptivity relationship of FIG. 9A.

Referring to the first to third graphs 9G1 to 9G3 of FIG. 9A, the first graph 9G1 shows that the first sub-pixel 30R has the highest light absorptivity when the wavelength of the incident light is about 612 nm. The second graph 9G2 shows that the second sub-pixel 30G has the highest light absorptivity when the wavelength of the incident light is about 490 nm. The third graph 9G3 shows that the third sub-pixel 30B has the highest light absorptivity when the wavelength of the incident light is about 400 nm.

Figure 9B:
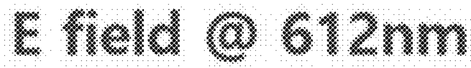
Figure 9B:
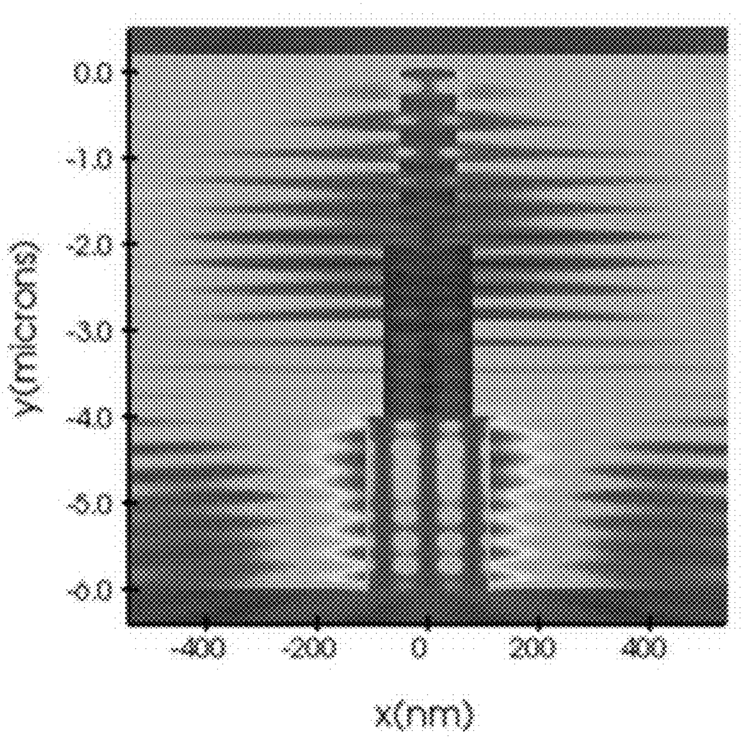
Figure 9B:
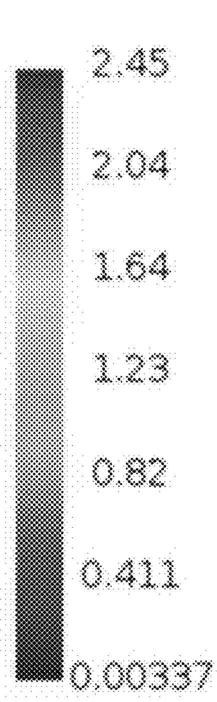

In FIG. 9B, the left image is a simulation image showing an electromagnetic field distribution representing light absorption of the first to third sub-pixels 30R, 30G, and 30B when the first wavelength (612 nm) belonging to red light is incident on the pixel 130, and the right image is a color diagram showing a light absorptivity by color. In the color diagram of the right image of FIG. 9B, the light absorptivity increases as the height of the sub-pixel increases, and the light absorptivity decreases as the height of the sub-pixel decreases.

According to FIG. 9B, the light absorptivity is the highest in the first sub-pixel pixel 30R when the first wavelength is incident on the pixel 130.

Figure 9C:
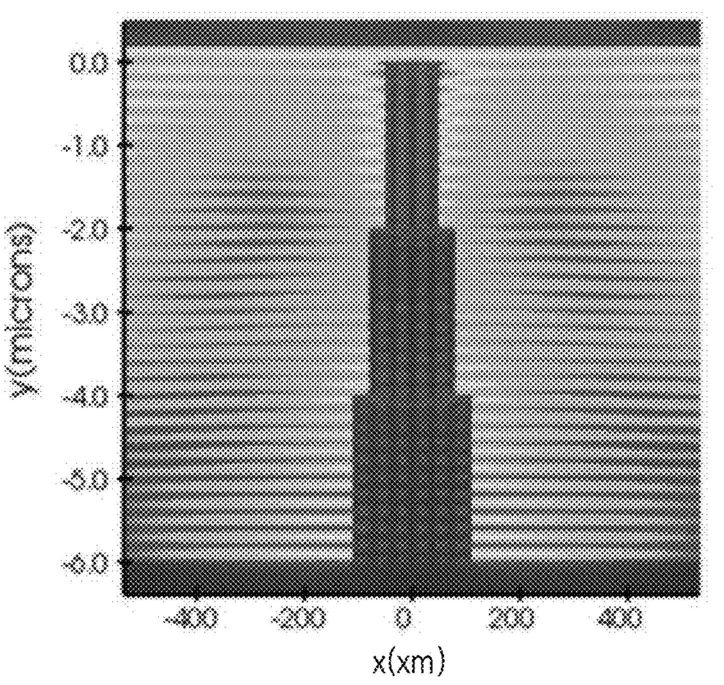
Figure 9C:
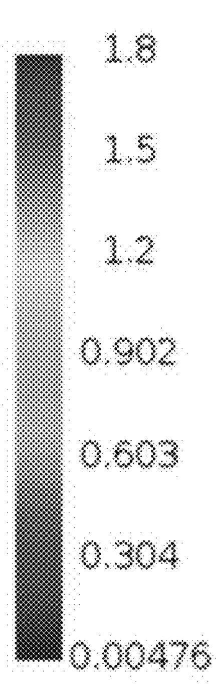

Regarding FIG. 9C, the left image is a simulation image showing an electromagnetic field distribution representing light absorption of the first to third sub-pixels 30R, 30G, and 30B when the third wavelength (400 nm) belonging to blue light is incident on the pixel 130, and the right image is a color diagram showing a light absorption rate.

Regarding FIG. 9C, the light absorptivity is highest in the third sub-pixel pixel 30B when the third wavelength is incident on the pixel 130.

Figure 9D:
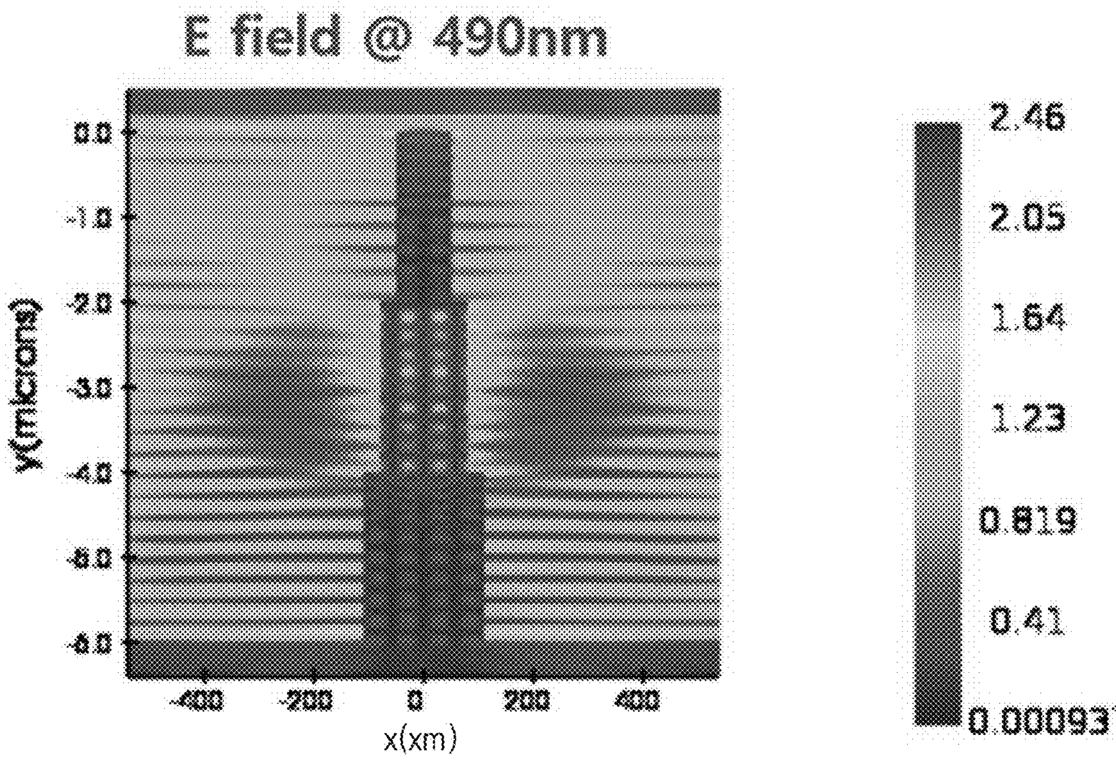

Regarding FIG. 9D, the left image is a simulation image showing an electromagnetic field distribution representing light absorption of the first to third sub-pixels 30R, 30G, and 30B when the second wavelength (490 nm) belonging to green light is incident on the pixel 130, and the right image is a color diagram showing a light absorption rate. According to FIG. 9D, the light absorptivity is the highest in the second sub-pixel pixel 30G when the second wavelength is incident on the pixel 130.

The first simulation result of FIGS. 9A, 9B, 9C, and 9D suggests that the maximum light absorption wavelength of each sub-pixel 30R, 30G, and 30B varies depending on the radius of the first to third sub-pixels 30R, 30G, and 30B. This result suggests that wavelength separation may be effectively achieved by varying diameters of the sub-pixels 30R, 30G, and 30B differently in the vertically stacked pixel 130. Because wavelength separation is effectively performed in the pixel 130 as described above, an additional filter for wavelength separation may be omitted.

Figure 10A:
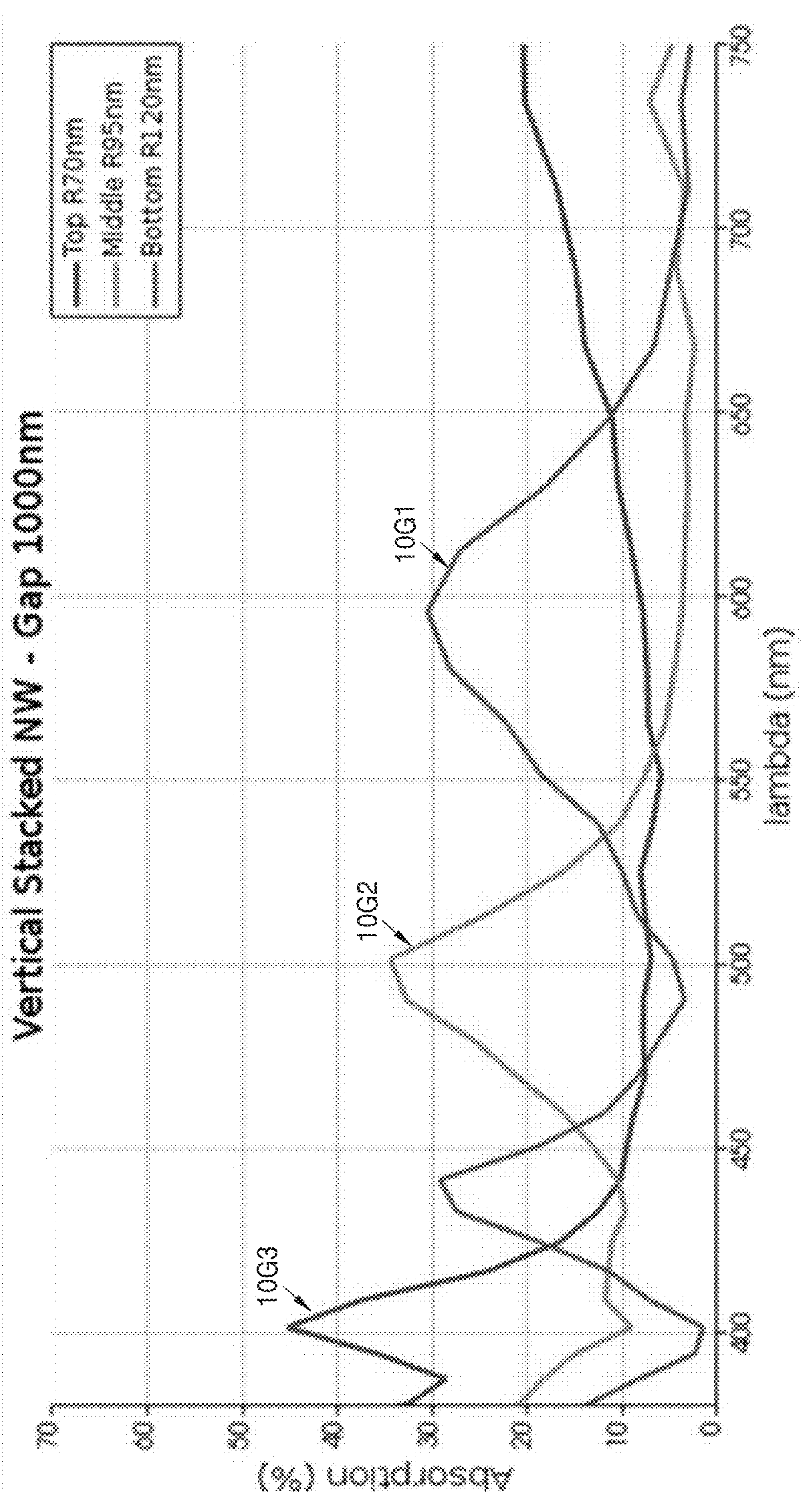

FIGS. 10A through to 12D show simulation results (hereinafter, second simulation) of the relationship between a distance between adjacent pixels 130 and a light absorption rate.

In the second simulation, a material of the pixel 130 and radii of the first to third sub-pixels 30R, 30G, and 30B are set to be the same as in the first simulation. In addition, in the second simulation, the pixel 130 was set to be incident with the first to third wavelengths similar to the first simulation.

FIGS. 10A, 10B, 10C, and 10D show a result of a case in which the distance between adjacent pixels 130 is set to 1000 nm in the second simulation.

In FIG. 10A is a graph showing a wavelength-light absorptivity relationship for the first to third sub-pixels 30R, 30G, and 30B.

Regarding FIG. 10A, a first graph 10G1 shows a wavelength-light absorptivity relationship for the first sub-pixel 30R. A second graph 10G2 shows a wavelength-light absorptivity relationship for the second sub-pixel 30G. A third graph 10G3 shows a wavelength-light absorptivity relationship for the third sub-pixel 30B.

Regarding FIG. 10A, the first graph 10G1 suggests that the first sub-pixel 30R has the highest light absorptivity at a wavelength of about 600 nm. The second graph 10G2 shows that the second sub-pixel 30G has the highest light absorption at a wavelength of about 500 nm, and the third graph 10G3 shows that the third sub-pixel 30B has the highest light absorptivity at a wavelength of about 400 nm.

Regarding FIG. 10B, the left image is a simulation image showing an electromagnetic field distribution representing light absorption when the first wavelength (for example, 612 nm) belonging to red light is incident on two adjacent pixels 130, and the right image is a color diagram described with reference to FIGS. 9A, 9B, 9C, and 9D.

Figure 10B:
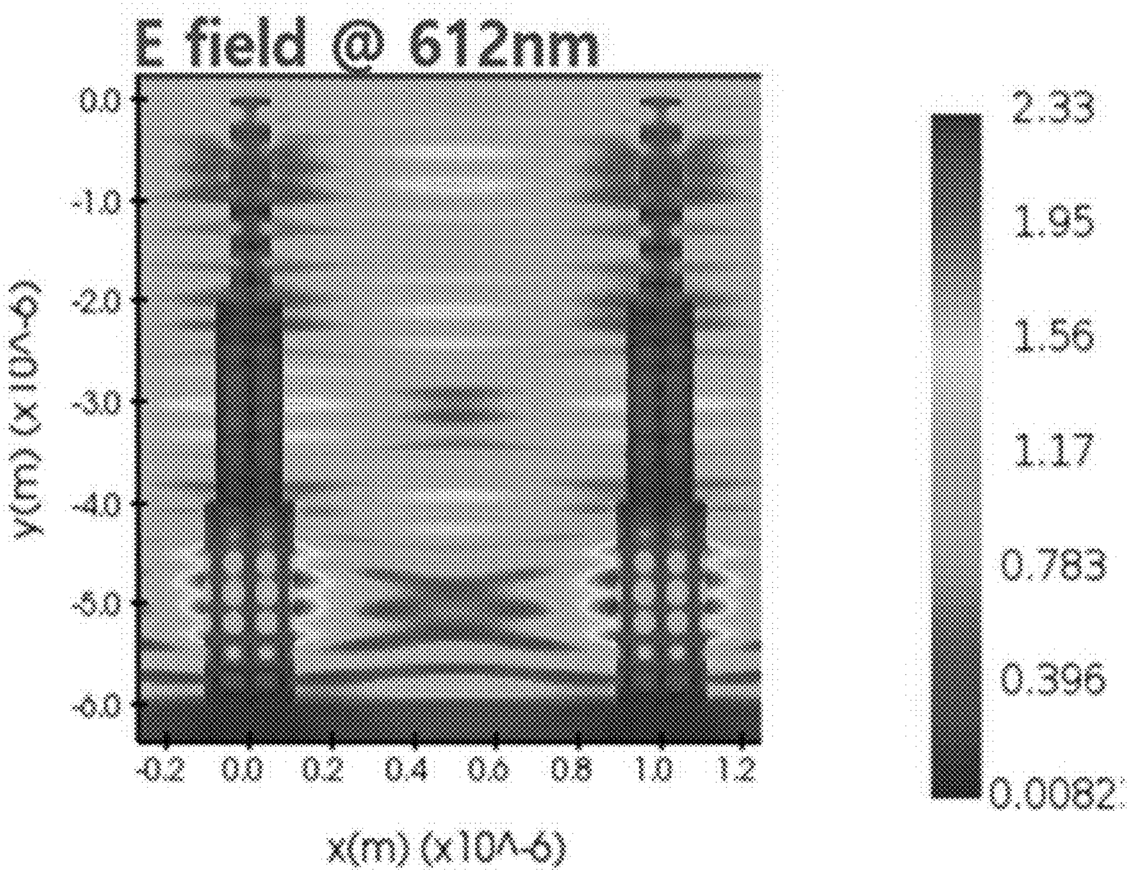

According to FIG. 10B, when the first wavelength belonging to red light is incident on two adjacent pixels 130, the light absorptivity is the highest in the first sub-pixel 30R.

Figure 10C:
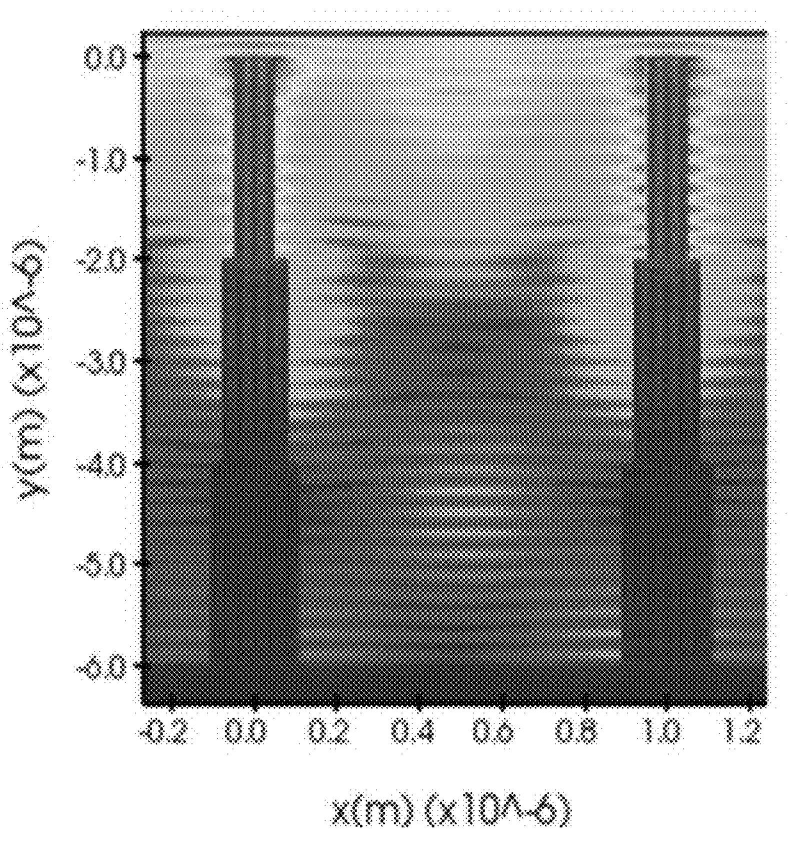
Figure 10C:
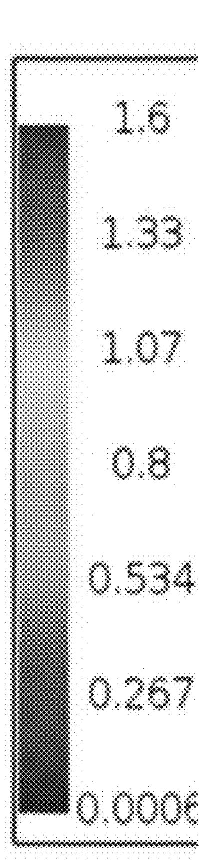

Regarding FIG. 10C, the left image is a simulation image showing an electromagnetic field distribution representing light absorption when the third wavelength (for example, 400 nm) belonging to blue light is incident on the two adjacent pixels 130, and the right image is a color diagram showing a light absorption rate.

According to FIG. 10C, when the third wavelength is incident on two adjacent pixels 130, the light absorptivity is highest in the third sub-pixel 30B.

Figure 10D:
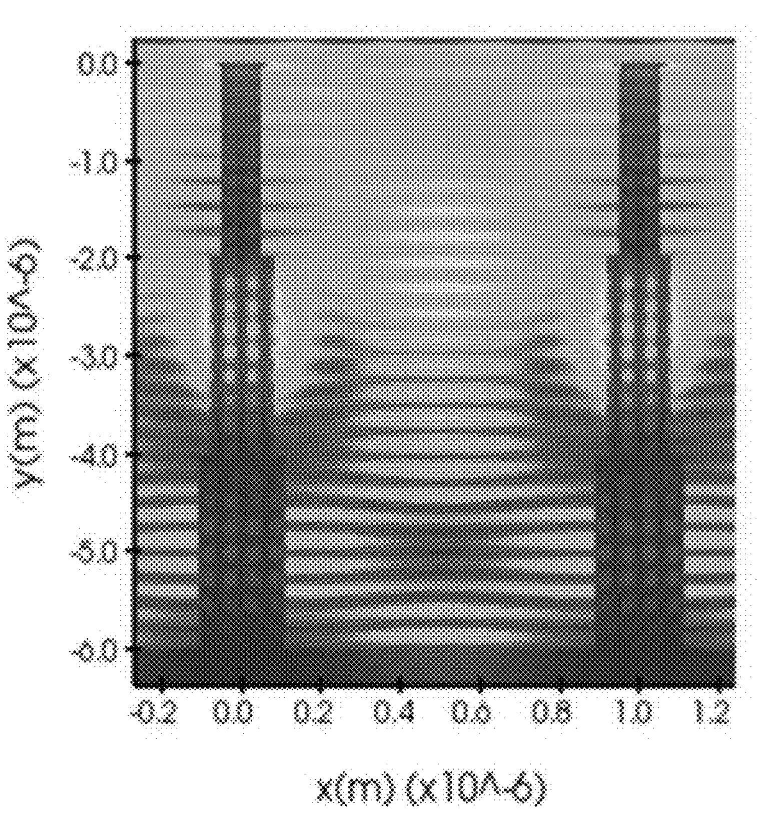
Figure 10D:
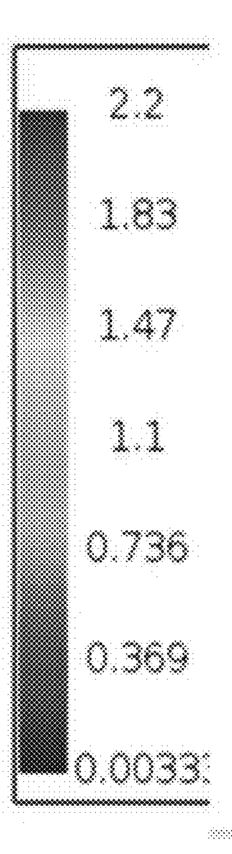

Regarding FIG. 10D, the left image is a simulation image showing an electromagnetic field distribution representing light absorption when the second wavelength (for example, 490 nm) belonging to green light is incident on the two adjacent pixels 130, and the right image is a color diagram showing a light absorption rate.

According to FIG. 10D, when the second wavelength is incident on two adjacent pixels 130, the light absorptivity is highest in the second sub-pixel 30G.

FIGS. 11A, 11B, 11C, and 11D show a result of a case in which the distance between adjacent pixels 130 is set to 750 nm in the second simulation.

Figure 11A:
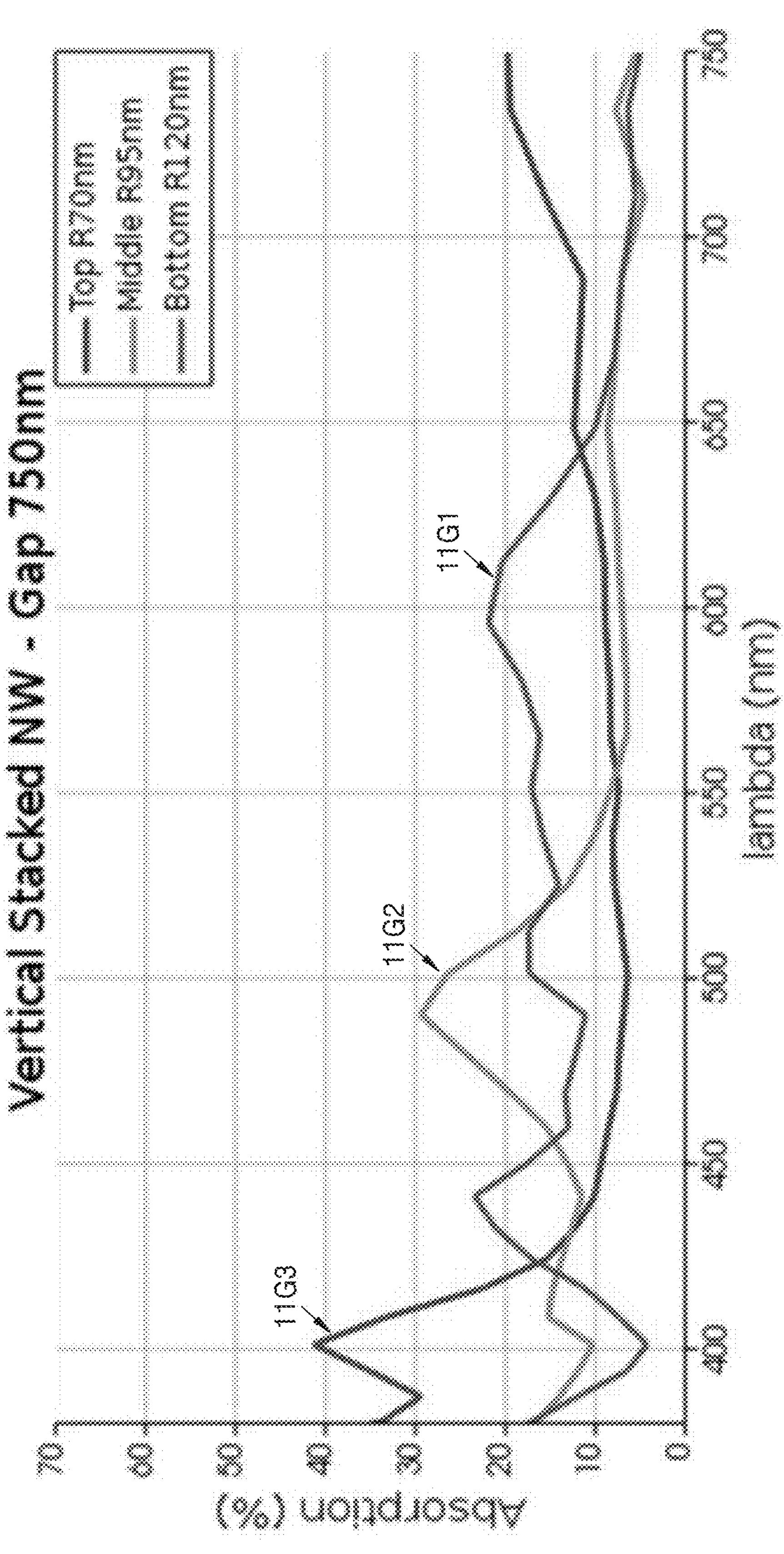

FIG. 11A is a graph showing the wavelength-light absorptivity relationship of the first to third sub-pixels 30R, 30G, and 30B.

Regarding FIG. 11A, a first graph 11G1 shows a wavelength-light absorptivity relationship for the first sub-pixel 30R, a second graph 11G2 shows a wavelength-light absorptivity relationship for the second sub-pixel 30G, and a third graph 11G3 shows a wavelength-light absorptivity relationship for the third sub-pixel 30B.

Regarding FIG. 11A, the first graph 11G1 shows that, in the case of the first sub-pixel 30R, the light absorptivity is highest at wavelengths of about 440 nm and about 600 nm and their vicinity, the second graph 11G2 shows that, in the case of the second sub-pixel 30G, the light absorptivity is highest at a wavelength of about 490 nm, and the third graph 11G3 shows that, in the case of the third sub-pixel 30B, the light absorptivity is highest at a wavelength of about 400 nm.

Figure 11B:
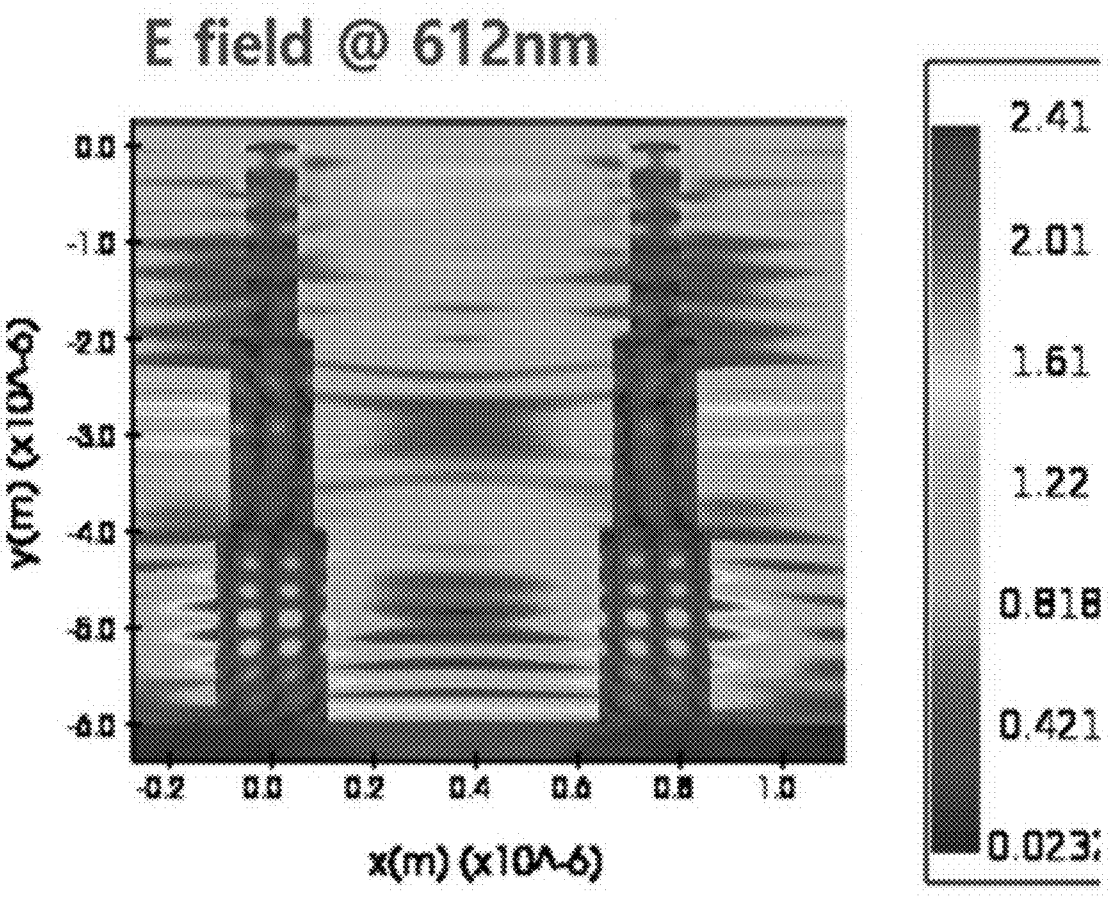

Regarding FIG. 11B, the left image is a simulation image showing light absorption when the first wavelength (for example, 612 nm) belonging to red light is incident on two adjacent pixels 130, and the right image is a color diagram showing light absorptivity.

According to FIG. 11B, when the first wavelength is incident on two adjacent pixels 130, the light absorptivity is highest in the first sub-pixel 30R.

Figure 11C:
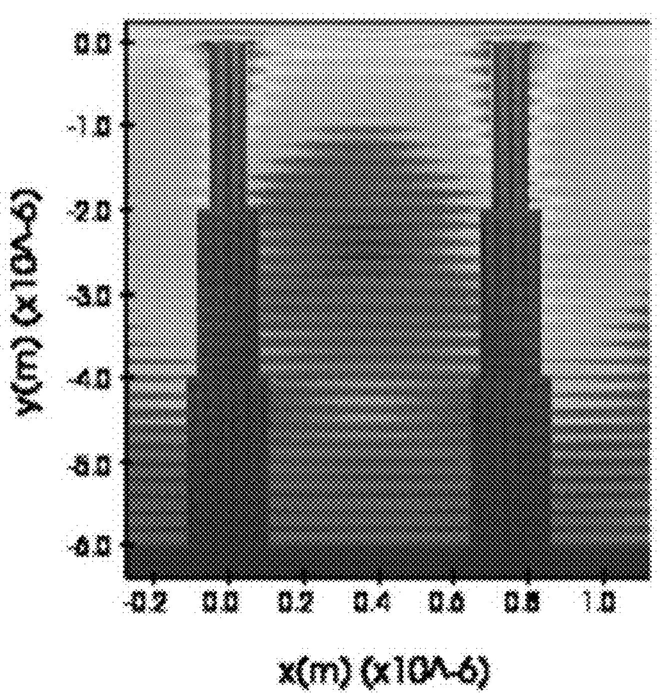
Figure 11C:
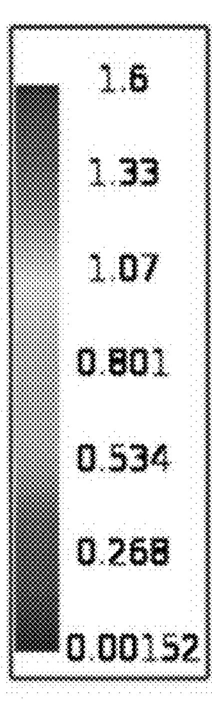

Regarding FIG. 11C, the left image is a simulation image showing light absorptivity when the third wavelength (for example, 400 nm) belonging to blue light is incident on two adjacent pixels 130, and the right image is a color diagram showing light absorptivity.

According to FIG. 11C, when the third wavelength is incident on two adjacent pixels 130, the light absorptivity is highest in the third sub-pixel 30B.

Figure 11D:
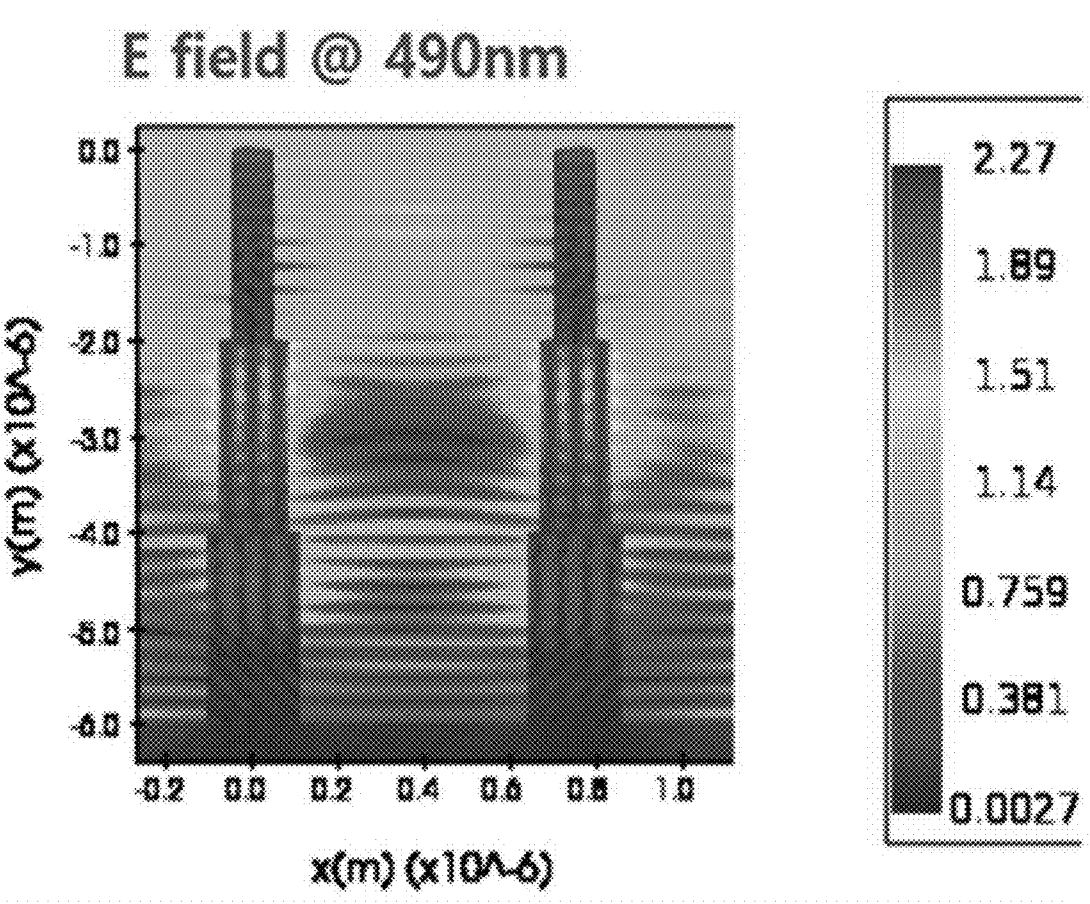

Regarding FIG. 11D, the left image is a simulation image showing light absorptivity when the second wavelength (for example, 490 nm) belonging to green light is incident on two adjacent pixels 130, and the right image is a color diagram showing light absorptivity.

According to FIG. 11D, when the second wavelength is incident on two adjacent pixels 130, the light absorptivity is highest in the second sub-pixel 30G.

FIGS. 12A, 12B, 12C, and 12D show a result of a case in which the distance between adjacent pixels 130 is set to 600 nm in the second simulation.

Figure 12A:
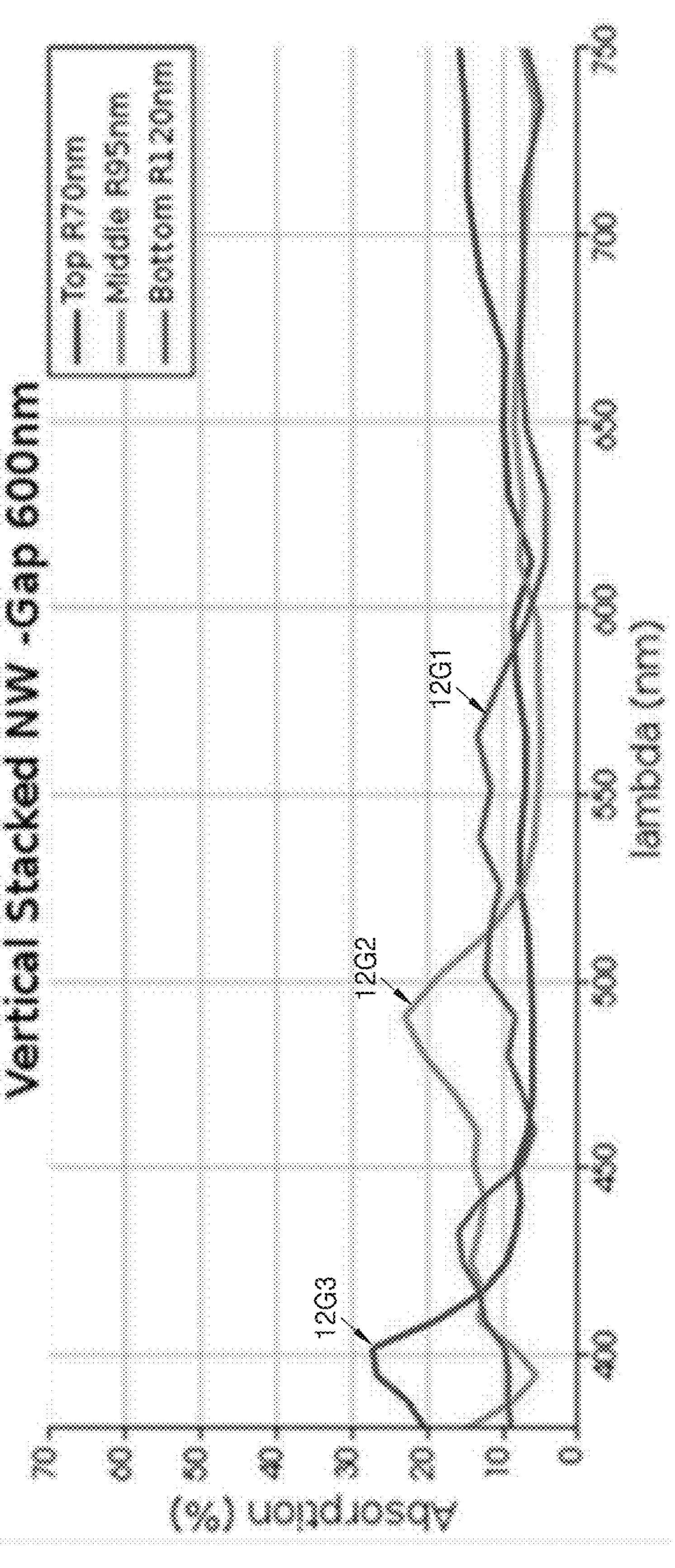

FIG. 12A is a graph showing a wavelength-light absorptivity relationship of the first to third sub-pixels 30R, 30G, and 30B.

Regarding FIG. 12A, a first graph 12G1 shows a wavelength-light absorptivity relationship for the first sub-pixel 30R, a second graph 12G2 shows a wavelength-light absorptivity relationship for the second sub-pixel 30G, and a third graph 12G3 shows a wavelength-light absorptivity relationship for the third sub-pixel 30B.

Regarding FIG. 12A, the first graph 12G1 shows that, in the case of the first sub-pixel 30R, the light absorptivity is highest at wavelengths of about 440 nm and about 560 nm and their vicinity, the second graph 12G2 shows that, in the case of the second sub-pixel 30G, the light absorptivity is highest at a wavelength of about 490 nm, and the third graph 12G3 shows that, in the case of the third sub-pixel 30B, the light absorptivity is highest at a wavelength of about 400 nm.

Figure 12B:
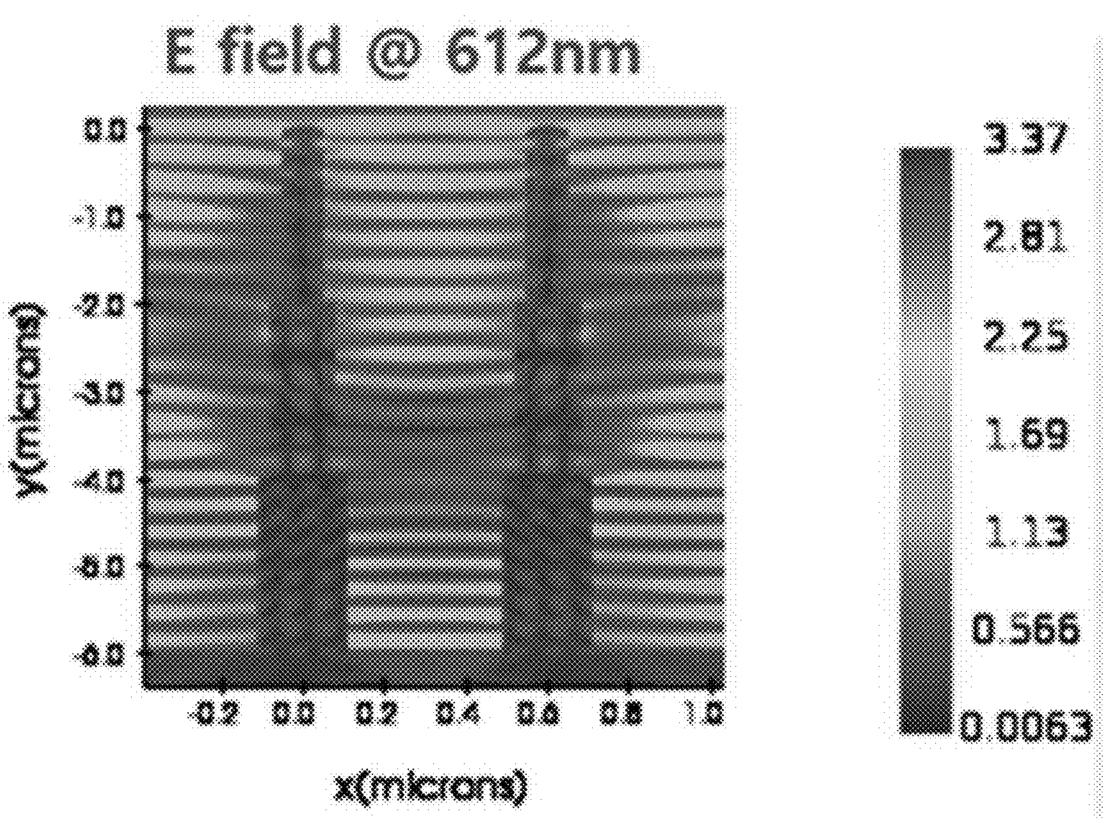

Regarding FIG. 12B, the left image is a simulation image showing light absorption when the first wavelength (for example, 612 nm) belonging to red light is incident on two adjacent pixels 130, and the right image is a color diagram showing light absorptivity According to FIG. 12B, when the distance between the two adjacent pixels 130 is about 600 nm and the first wavelength is incident on the two adjacent pixels 130, the light absorptivity of the entire first to third sub-pixels 30R, 30G, and 30B is low.

Figure 12C:
Figure 12C:
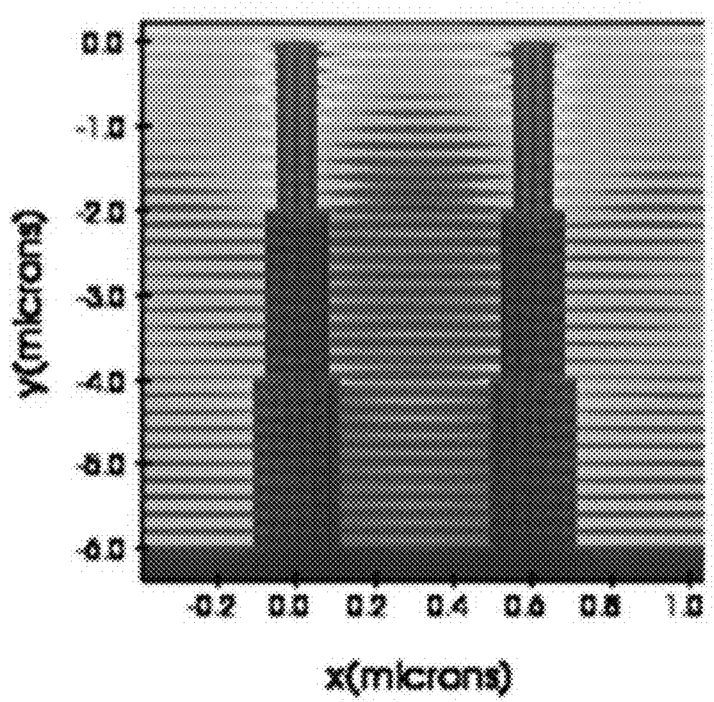
Figure 12C:
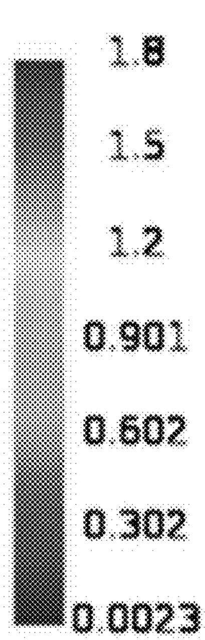

Regarding FIG. 12C, the left image is a simulation image showing light absorptivity when the third wavelength (for example, 400 nm) belonging to blue light is incident on two adjacent pixels 130, and the right image is a color diagram showing light absorptivity.

According to FIG. 12C, when the third wavelength is incident on two adjacent pixels 130, the light absorptivity is highest in the third sub-pixel 30B.

Figure 12D:
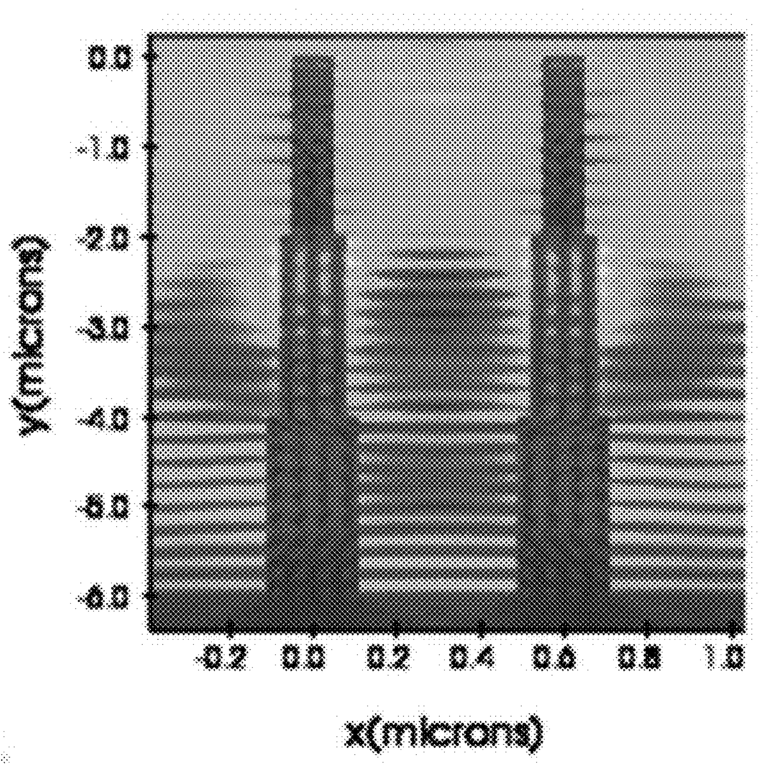
Figure 12D:
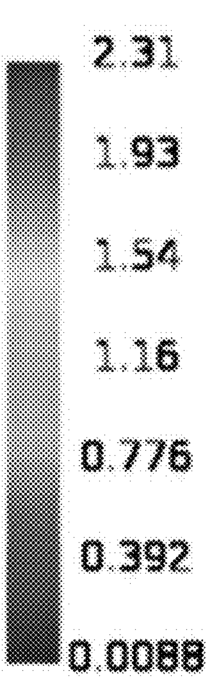

Regarding FIG. 12D, the left image is a simulation image showing light absorption when the second wavelength (for example, 490 nm) belonging to green light is incident on two adjacent pixels 130, and the right image is a color diagram showing light absorptivity.

According to FIG. 12D, when the second wavelength is incident on two adjacent pixels 130, the light absorptivity is highest in the second sub-pixel 30G.

The second simulation results shown in FIGS. 10A to 12D suggest that the distance between two adjacent pixels 130 affects the light absorptivity of a pixel, when a gap between two pixels 130 is greater than a predetermined distance, there is no interference between absorption resonance modes of the two pixels 130, thus, there is no problem in wavelength separation in the two adjacent pixels 130. However, when the two adjacent pixels 130 are closer than the predetermined distance, the absorption resonance modes of the two adjacent pixels 130 interfere with each other, and thus, the light absorptivity of the two adjacent pixels 130 may decrease.

Figure 13A:
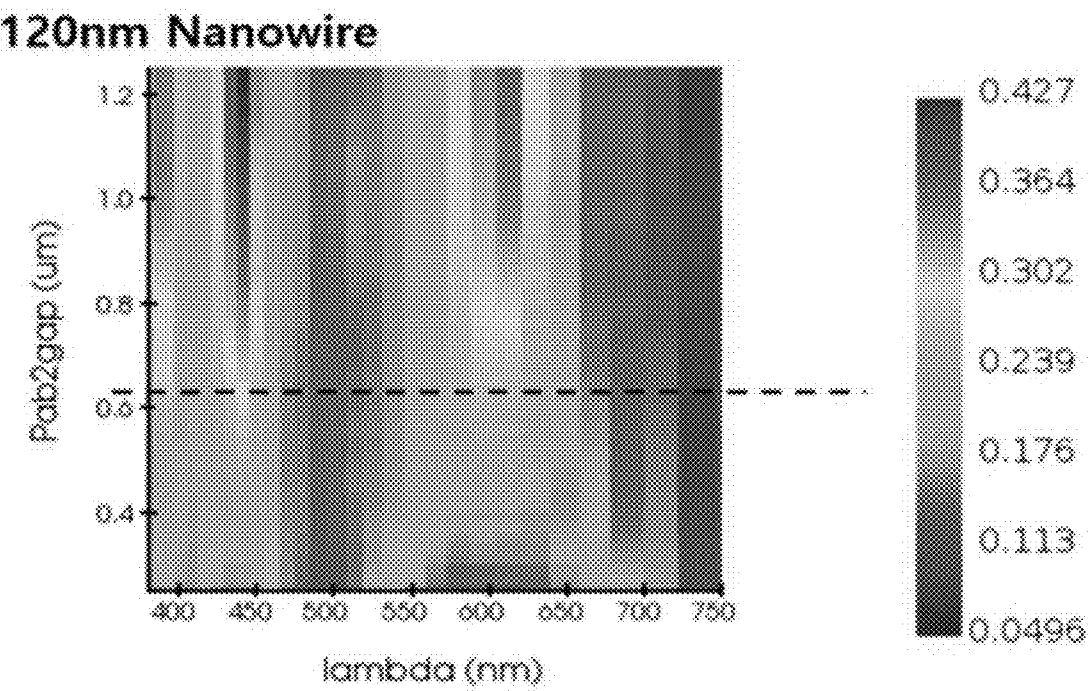

FIGS. 13A and 14C show simulation results (hereinafter referred to as a third simulation) of a change in light absorptivity of a corresponding sub-pixel according to a distance (gap) between two adjacent sub-pixels.

Figure 13B:
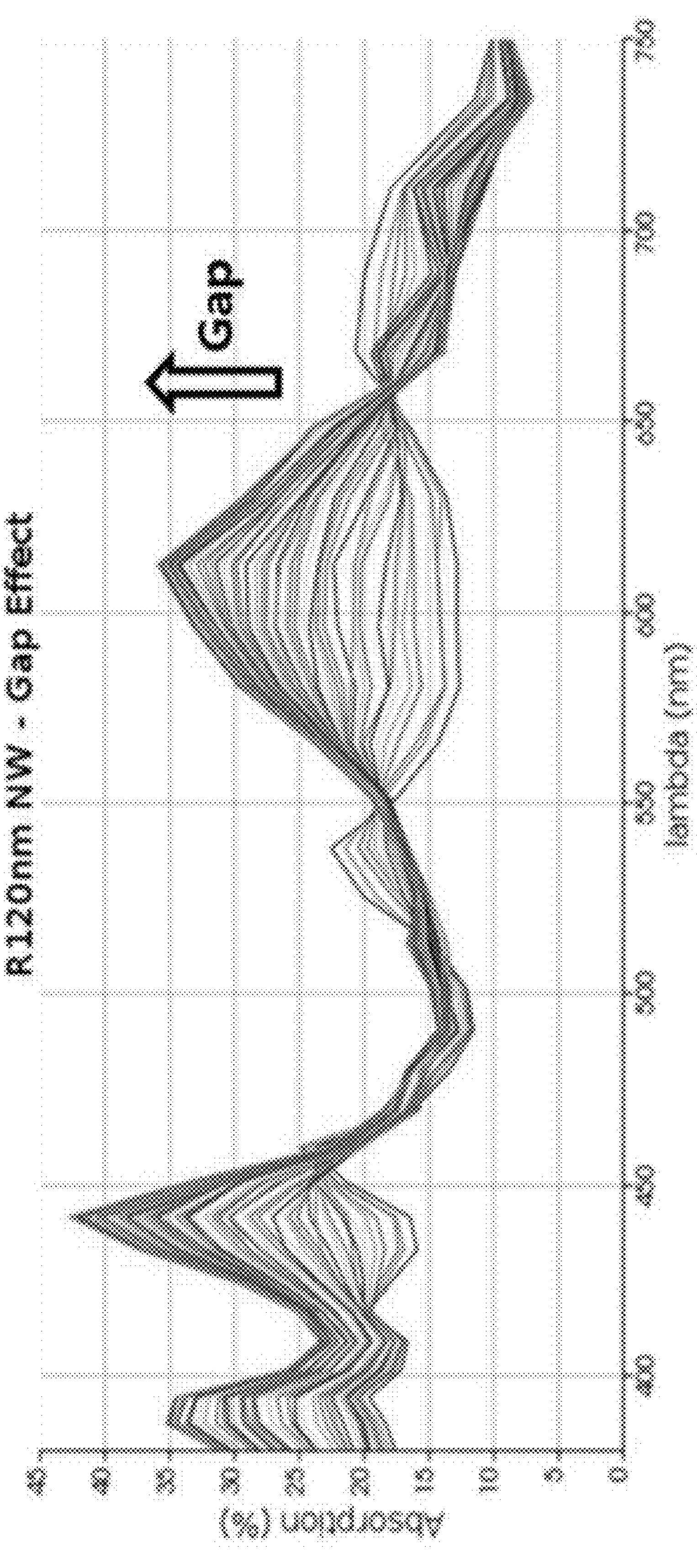
Figure 13C:
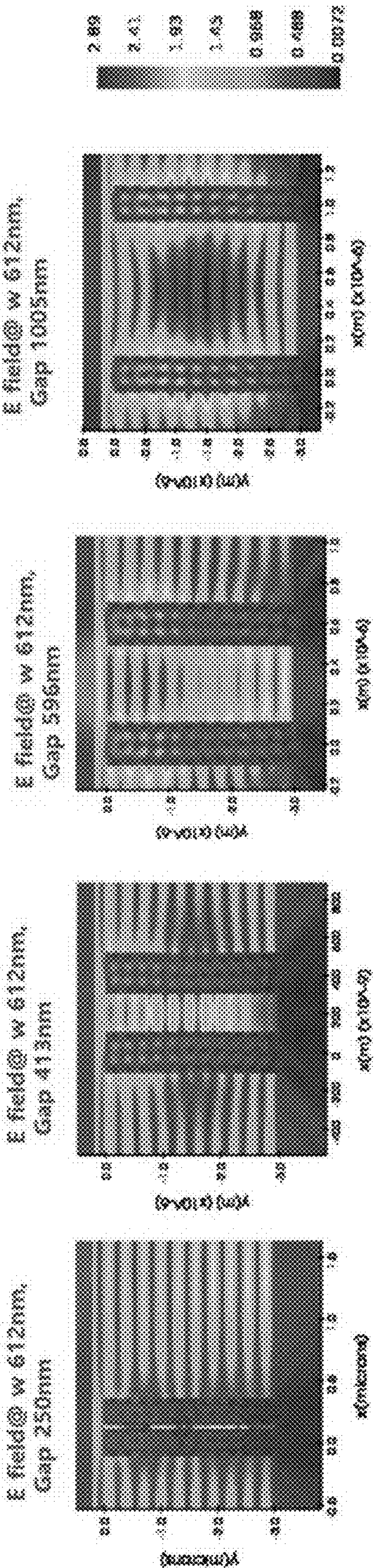
Figure 14A:
Figure 14A:
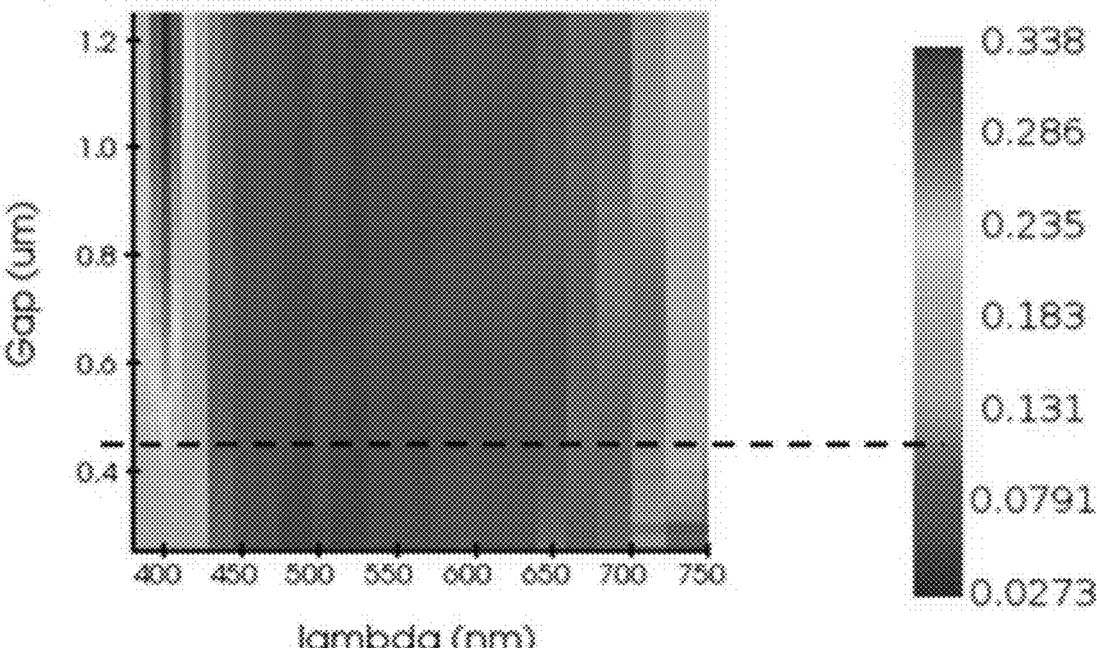
Figure 14B:
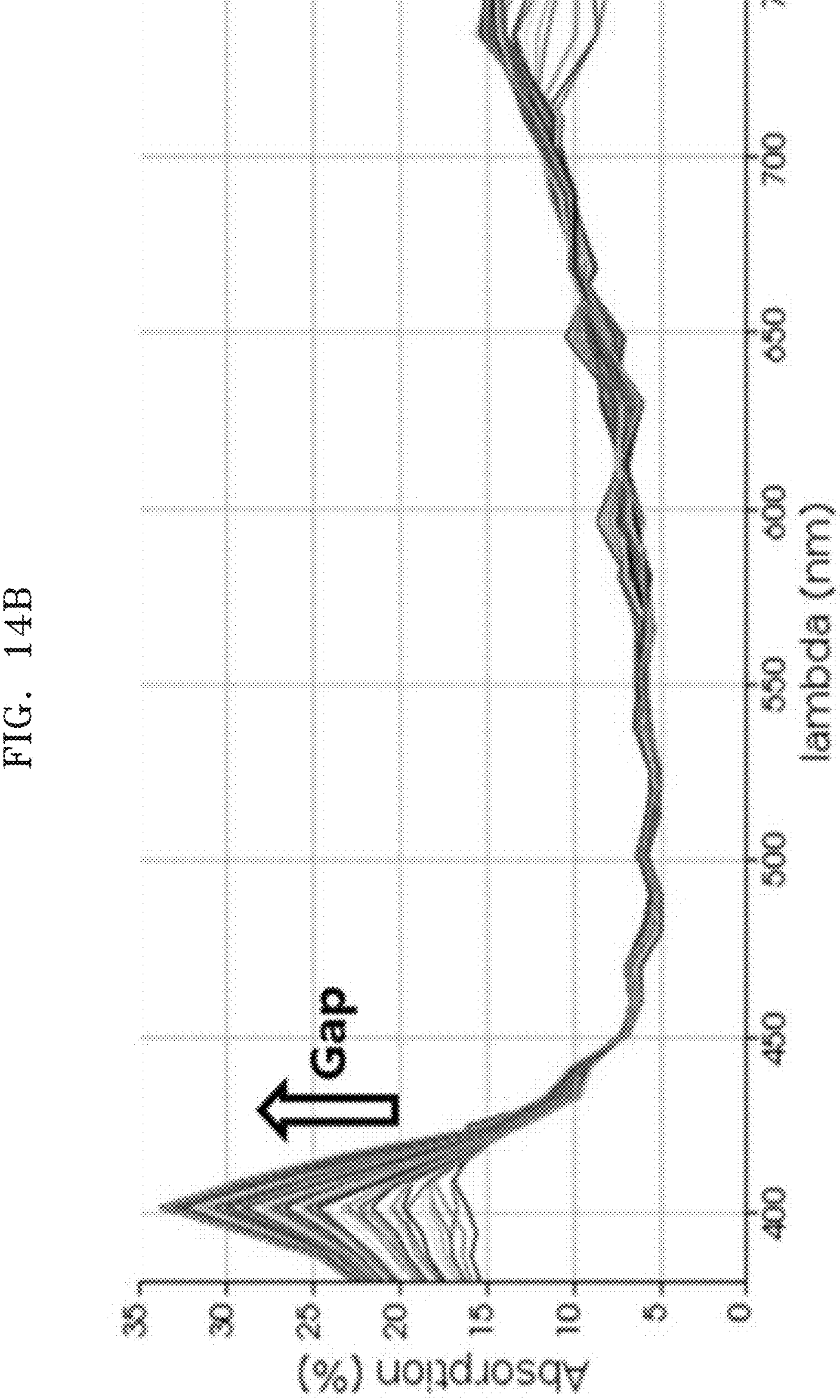

In FIGS. 13A, 13B, and 13C, the sub-pixel is set to the first sub-pixel 30R (radius=120 nm) set in FIGS. 9A, 9B, 9C, and 9D in the third simulation, and in FIGS. 14A, 14B, and 14C, the sub-pixel is set to the third sub-pixel 30B (radius=70 nm) set in FIGS. 9A, 9B, 9C, and 9D in the third simulation.

Regarding FIGS. 13A and 14A, the left image is a light absorptivity map showing changes in light absorptivity of adjacent first sub-pixels 30R according to a distance between the adjacent first sub-pixels 30R and a wavelength of incident light, and the right image is the color diagram described with reference to FIGS. 9A, 9B, 9C, and 9D.

FIGS. 13B and 14B show a graph of the light absorptivity map of FIGS. 13A and 14A, and the influence (effect) of the distance (gap) of the adjacent first sub-pixels 30R at a specific wavelength may be more easily recognized.

According to FIGS. 13A and 13B, in wavelengths belonging to blue or red light, light absorptivity of the first sub-pixel 30R increases as the distance between adjacent first sub-pixels 30R increases, but as the distance decreases, light absorptivity of the first sub-pixel 30R is reduced.

According to FIGS. 14A and 14B, in a wavelength belonging to blue light, the light absorptivity of the third sub-pixel 30B increases as the distance between adjacent third sub-pixels 30B increases, but as the distance between adjacent third sub-pixels 30B decreases, the light absorptivity of the third sub-pixel 30B is reduced.

FIGS. 13C and 14C show examples of the above results.

FIG. 13C illustrates simulation images showing an electromagnetic field distribution showing changes in light absorptivity of the first sub-pixel 30R when a wavelength of incident light is 612 nm and the distance between adjacent first sub-pixels 30R is 250 nm, 413 nm, 596 nm, and 1005 nm, respectively.

FIG. 14C illustrates simulation images showing an electromagnetic field distribution showing changes in light absorptivity of the third sub-pixel 30B when a wavelength of incident light is 401 nm and the distance between adjacent third sub-pixels 30B is 250 nm, 413 nm, 596 nm, and 1005 nm, respectively. Regarding FIGS. 13C and 14C, the far right image is the color diagram described with reference to FIGS. 9A, 9B, 9C, and 9D.

FIG. 13C suggests that the light absorptivity increases as the distance between the two adjacent first sub-pixels 30R increases, and the light absorptivity decreases as the distance between the two adjacent first sub-pixels 30R decreases.

FIG. 14C suggests that the light absorptivity increases as the distance between the adjacent third sub-pixels 30B increases, and the light absorptivity decreases as the distance between the adjacent third sub-pixels 30B decreases.

Comparing FIG. 13C and FIG. 14C, relatively the smaller the radius of the sub-pixel, the smaller the breakage of the absorption wavelength according to the proximity of the two sub-pixels (the less breakage of the absorption resonance mode), and when the radius is relatively large, the absorption wavelength reacts sensitively according to the proximity of the two sub-pixels, and thus the absorption resonance mode may be broken and the wavelength characteristics may be changed.

Figure 15A:
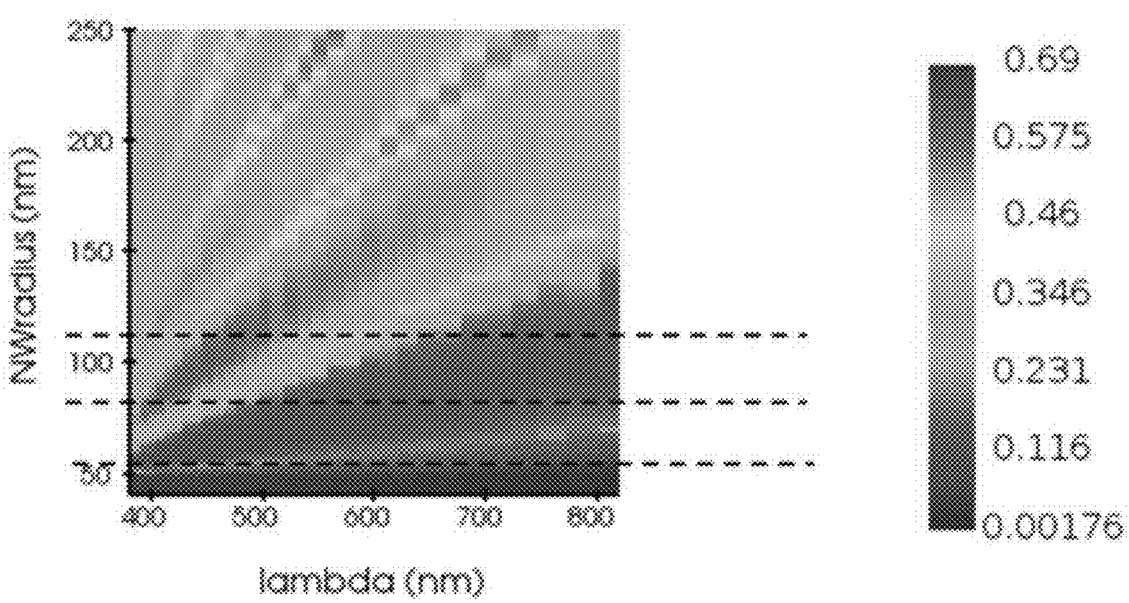

FIG. 15A is a light absorptivity map showing, in color, changes in light absorptivity according to a radius of the pixel 130 of FIGS. 1 to 3 and a wavelength of incident light, and the right image is a color diagram described with reference to FIGS. 9A, 9B, 9C, and 9D and showing a relationship between color and light absorptivity.

The light absorptivity map of FIG. 15A may provide information on the light absorptivity of the pixel 130 according to a wavelength of incident light when the pixel 130 has a specific radius. By using the information together with the characteristics that the transmittance or penetration depth of visible light with respect to the same transparent material varies with the wavelength, the pixel 130 may be configured to include a plurality of vertically stacked sub-pixels having different light absorptivity for each wavelength and different widths. The case in which the pixel 130 includes the first to third sub-pixels 30R, 30G, and 30B illustrated in FIG. 4 is just an example of a vertically stacked structure of pixels 130 that may be formed using the light absorptivity map of FIG. 15A.

By using the light absorptivity map of FIG. 15A, the pixel 130 may be formed to include a vertically stacked structure including a plurality of sub-pixels having different radii while having different light absorptivity for three or more different wavelengths.

Figure 18:
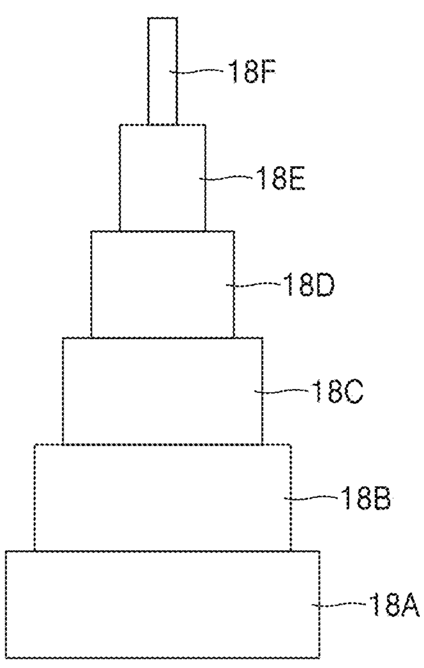
FIG. 18 is a cross-sectional view illustrating a case in which the pixels of the vertically stacked type image sensor shown in FIGS. 1 to 3 include six sub-pixels having different widths that are sequentially and vertically stacked.

For example, as illustrated in FIG. 18, the pixel 130 may include a first sub-pixel 18A, a second sub-pixel 18B, a third sub-pixel 18C, a fourth sub-pixel 18D, a fifth sub-pixel 18E, and a sixth sub-pixel 18F sequentially and vertically stacked. A layer structure of each of the sub-pixels 18A to 18F may be the same as that of each of the sub-pixels 30R, 30G, and 30B illustrated in FIG. 7. The width may sequentially decrease from the first sub-pixel 18A to the sixth sub-pixel 18F. The widths of the first to sixth sub-pixels 18A to 18F may be selected so that wavelengths at which absorption resonance may occur are different from each other by using information provided by the light absorptivity map of FIG. 15A. The width of the sub-pixels may decrease from the first sub-pixel 18A to the sixth sub-pixel 18F, and the wavelength at which absorption resonance occurs may also be shortened. In this way, the pixel 130 including the first to sixth sub-pixels 18A to 18F may separate six wavelengths from light incident on the pixel 130. This suggests that the same six images of different colors may be acquired simultaneously through the pixel 130. The same six images may include a red image, a blue image, a green image, an image having a color between red and blue, an image having a color between blue and green, and an image having a different color from the above images. Depending on the color, the density or sharpness of the six images may be different from each other. Therefore, with respect to the same object, an image obtained when the pixel 130 includes the first to sixth sub-pixels 18A to 18F may be different from an image obtained when the pixel 130 includes the first to third sub-pixels 13R, 13G, and 13B of FIG. 4.

The light absorptivity map of FIG. 15A does not limit the number of vertically stacked sub-pixels that may be included in the pixel 130. Accordingly, the pixel 130 may be formed by sequentially stacking N sub-pixels having different radii from each other to have different absorption resonance wavelengths. For example, N may be 3, 4, 8, 16, 64, 128, or 200 or more within a permissible range by the size of the vertically stacked type image sensor 120, but is not limited thereto.

As a result, the vertically stacked type image sensor 120 may obtain an image (for example, a hyperspectral image) that may not be obtained with an RGB image sensor by appropriately selecting the number of vertically stacked sub-pixels of the pixel 130. For example, the vertically stacked type image sensor 120 may be used as an RGB image sensor or a hyperspectral image sensor depending on the configuration of the vertically stacked structure of the pixels 130.

Figure 15B:
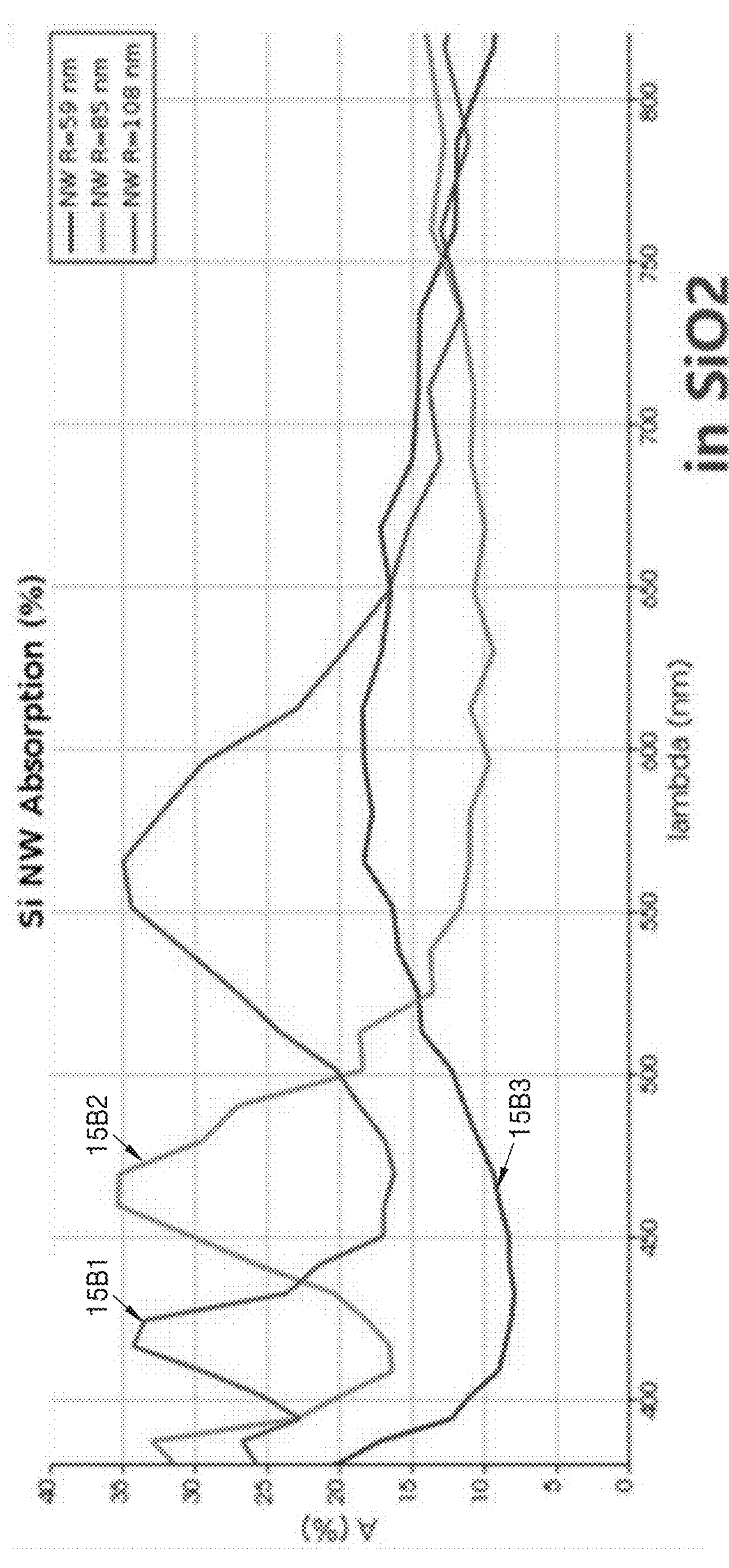

FIGS. 15B and 15C are extracted from the light absorptivity map of FIG. 15A, and are graphs showing the wavelength-light absorptivity relationship when the pixel 130 is in the form of a nanowire and the radius of the pixel 130 is 108 nm, 85 nm, and 59 nm. FIG. 15B shows a wavelength-light absorptivity relationship when the insulating layer 235 surrounding the pixel 130 is silicon oxide (e.g., $SiO_2$), and FIG. 15C shows a wavelength-light absorptivity relationship when the insulating layer 235 is an air layer.

Regarding FIGS. 15B and 15C, first graphs 15B1 and 15C1 show the wavelength-light absorptivity relationship when the radius of the pixel 130 is 108 nm, second graphs 15B2 and 15C2 show the wavelength-light absorptivity relationship when the radius of the pixel 130 is 85 nm, and third graphs 15B3 and 15C3 show the wavelength-light absorptivity relationship when the radius of the pixel 130 is 59 nm.

Comparing FIGS. 15B and 15C, the pattern of the wavelength-light absorptivity graph is substantially similar, but when the insulating layer 235 surrounding the pixel 130 is a silicon oxide layer, the light absorptivity is lower than when the insulating layer 235 is an air layer.

Figure 16A:
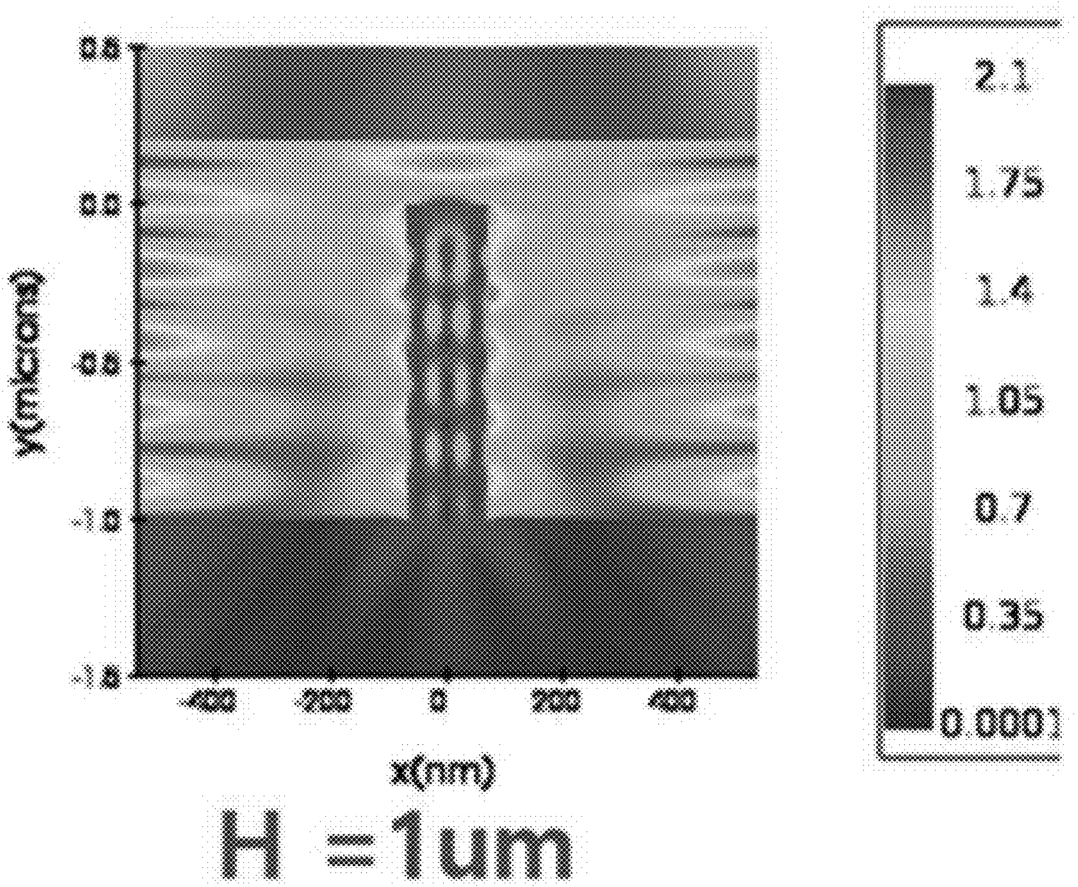
FIGS. 16A, 16B, and 16C show simulation results to examine a change in light absorptivity according to pixel heights of the vertically stacked type image sensors shown in FIGS. 1 to 3.
Figure 16B:
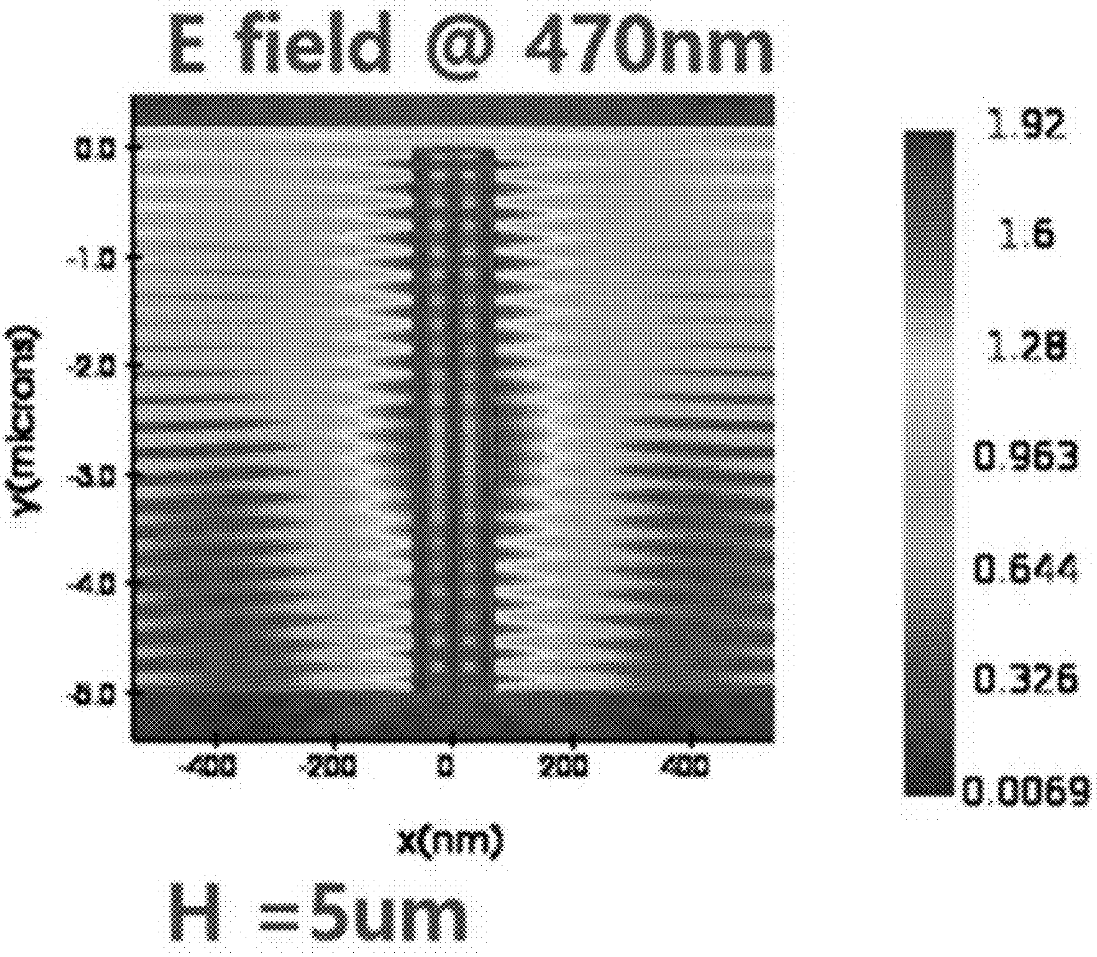
Figure 16C:
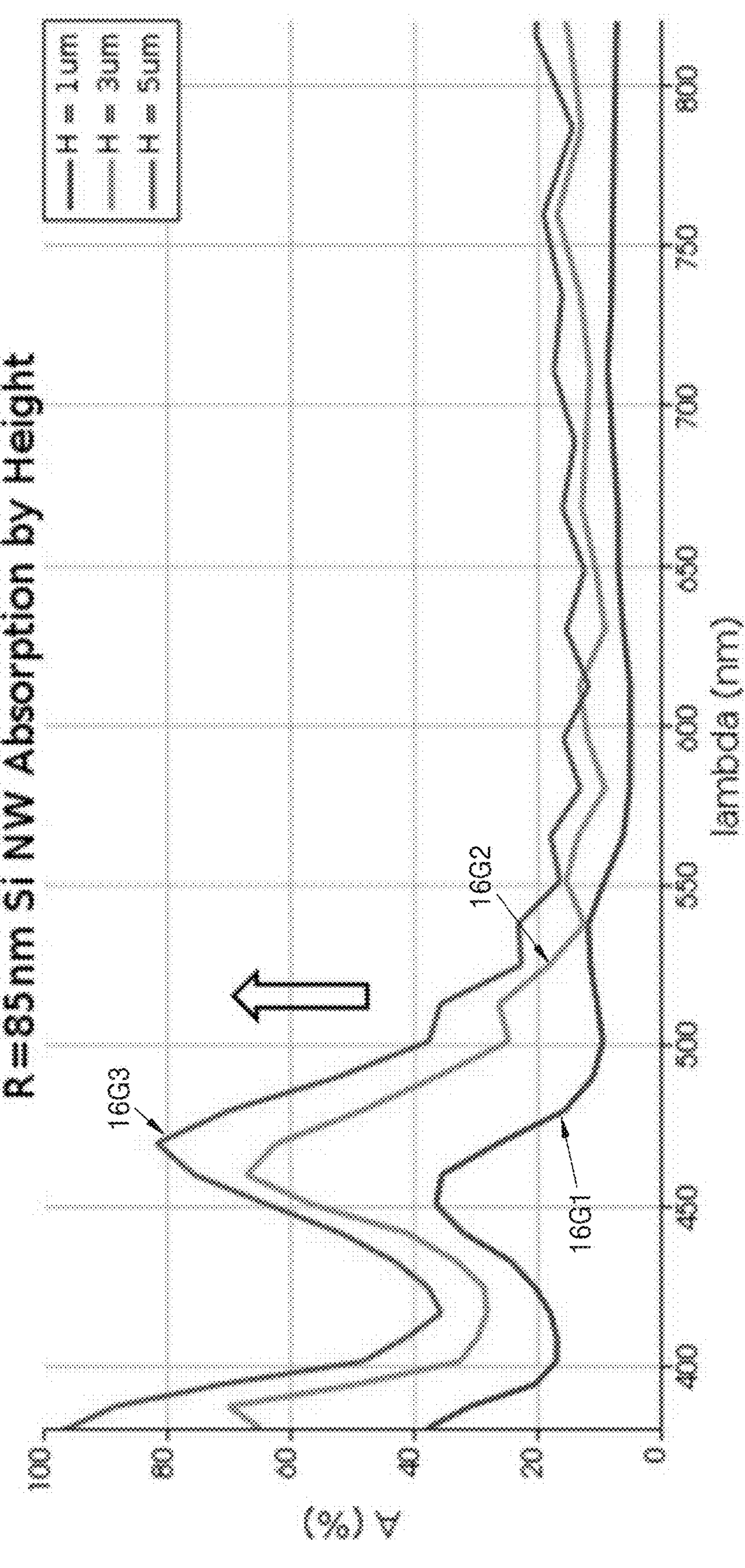

FIGS. 16A, 16B, and 16C show simulation results (hereinafter referred to as fourth simulations) performed to determine a change in light absorptivity according to the height of the pixel 130.

In the fourth simulation, the pixel 130 is set to be in the form of a nanowire having a constant radius, and the radius is set to 85 nm. The fourth simulation was performed by dividing the height of the pixel 130 set in this way into 1 μm, 3 μm, and 5 μm.

FIG. 16A is a simulation image showing light absorption of the pixel 130 when the height of the pixel 130 is 1 μm and a wavelength of incident light is 450 nm, and FIG. 16B is a simulation image showing light absorption of the pixel 130 when the height of the pixel 130 is 5 μm and a wavelength of incident light is 470 nm. Comparing FIG. 16A and FIG. 16B, light absorptivity increases as the height of the pixel 130 increases.

FIG. 16C is a graph showing a change in light absorptivity according to the height of the pixel 130 and the wavelength of incident light. Regarding FIG. 16C, a first graph 16G1 shows the change in light absorptivity when the height of the pixel 130 is 1 μm, a second graph 16G2 shows the change in light absorptivity when the height of the pixel 130 is 3 μm, and a third graph 16G3 shows the change in light absorptivity when the height of the pixel 130 is 5 μm. The first to third graphs 16G1 to 16G3 of FIG. 16C suggest that the light absorptivity increases as the height of the pixel 130 increases.

In the fourth simulation, because the pixel 130 is set to be in the form of a nanowire having a constant radius, the result of the fourth simulation may be applied to each sub-pixel forming the vertical stacked type structure of the pixel 130, for example, each of the sub-pixels 30R, 30G, and 30B illustrated in FIG. 4 or to each of the sub-pixels 18A, 18B, 18C, 18D, 18E, and 18F illustrated in FIG. 18.

Considering the fourth simulation result and FIGS. 15B and 15C, the fourth simulation result may be considered as one of a method to compensate for the decrease in light absorptivity that may occur when the insulating layer 235 surrounding the pixel 130 is a solid material layer instead of an air layer. For example, the increase in the height of the pixel 130 and the increase in the refractive index of the insulating layer 235 surrounding the pixel 130 may have a complementary relationship or a trade-off relationship with respect to light absorptivity.

FIGS. 17A, 17B, 17C, and 17D are images showing results of light absorption simulation (hereinafter referred to as a fifth simulation) when the pixel 130 of FIGS. 1 to 3 includes N sub-pixels described with reference to FIGS. 15A, 15B, and 15C.

In the fifth simulation, because the pixel 130 has a shape in which N sub-pixels are vertically stacked with widths sequentially decreasing upwards, for convenience, the pixel 130 is assumed to have a pyramid structure and an upper width is set to 120 nm and a lower width is set to 300 nm.

Figure 17A:
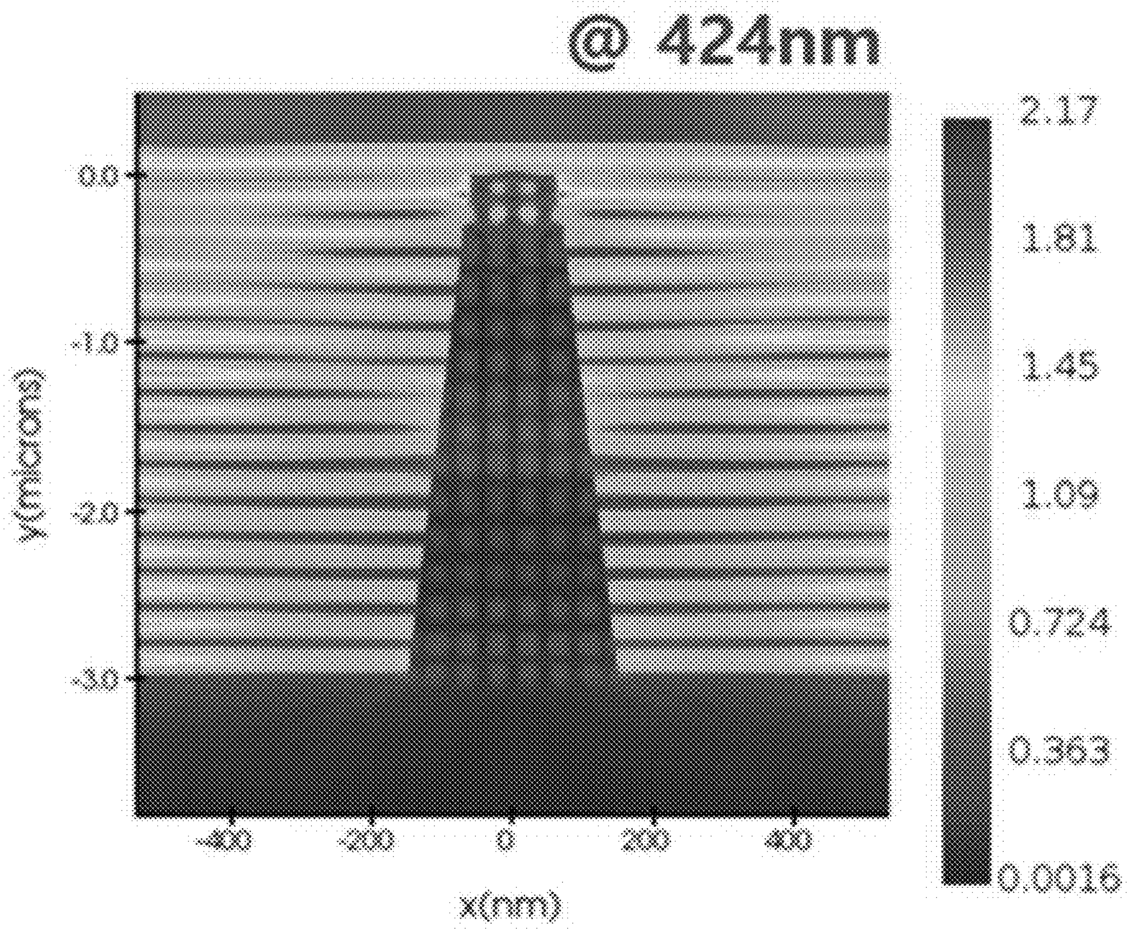
FIGS. 17A, 17B, 17C, and 17D are images showing a light absorption simulation result for a case in which the pixels of the vertically stacked type image sensor shown in FIGS. 1 to 3 include N sub-pixels.
Figure 17B:
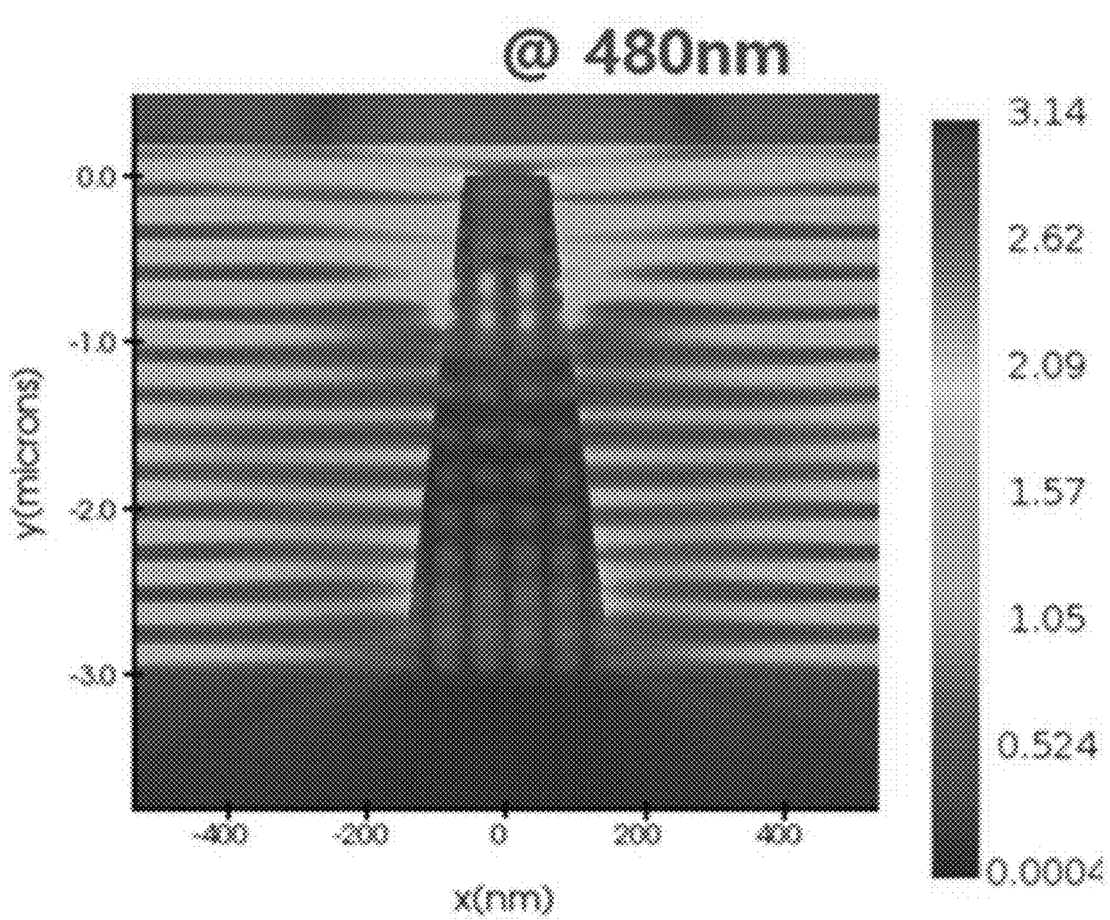
Figure 17C:
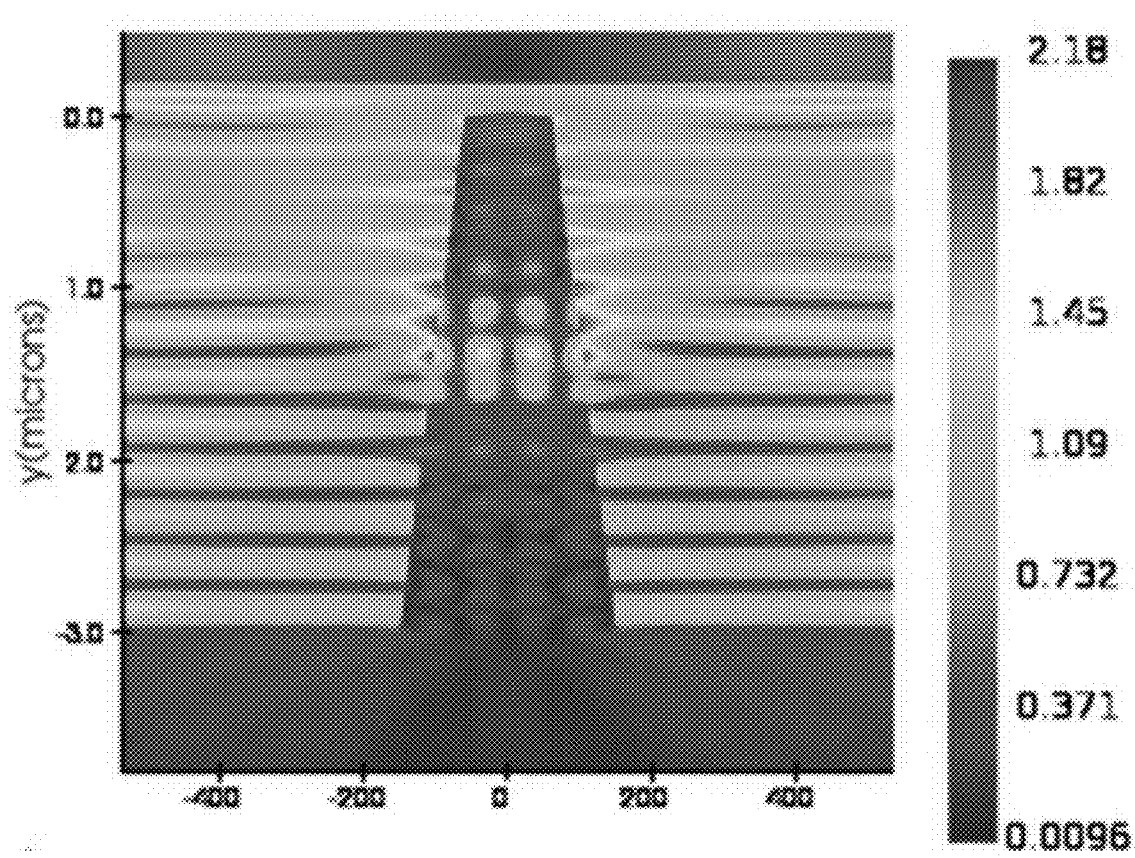
Figure 17D:
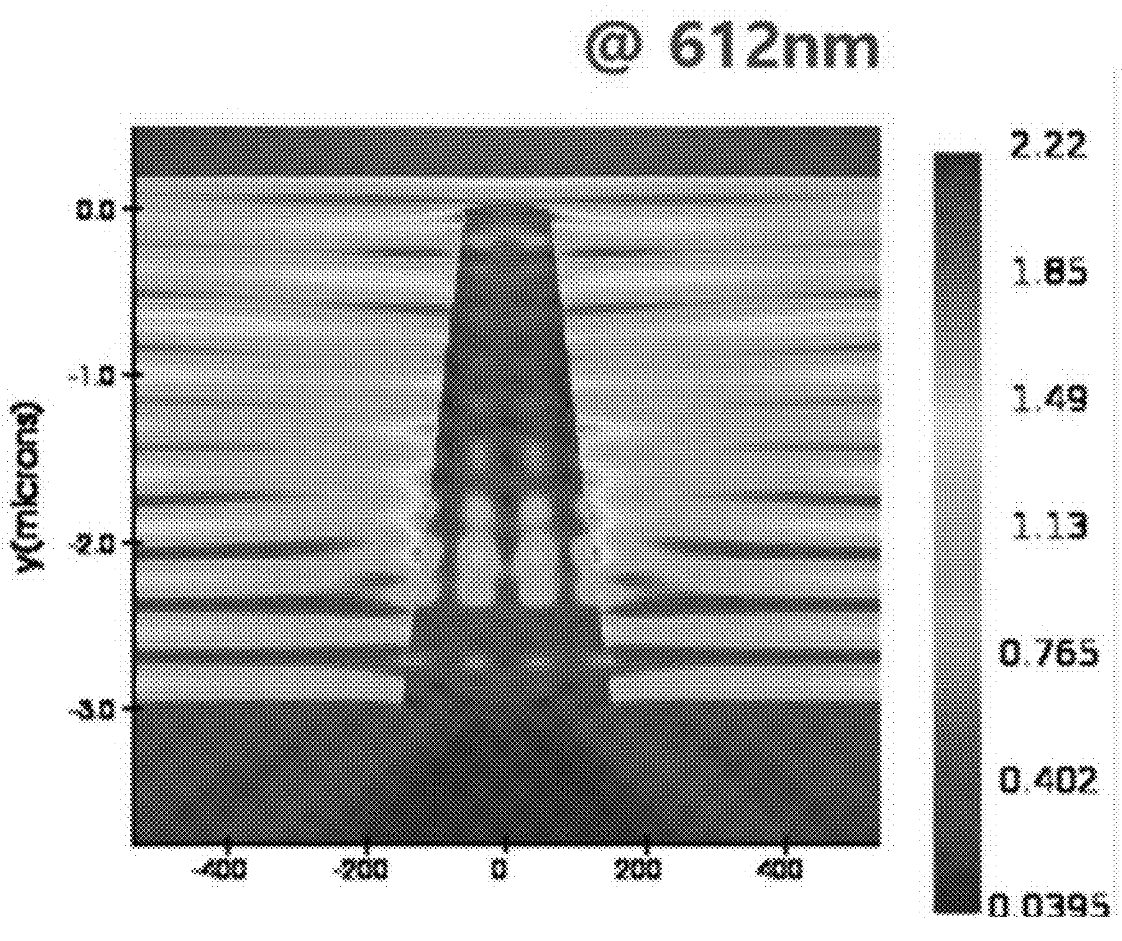

FIG. 17A is an image showing light absorption of the pixel 130 when the wavelength of light incident on the pixel 130 is 424 nm, FIG. 17B is when the wavelength of the incident light is 480 nm, FIG. 17C is when the wavelength of the incident light is 538 nm, and FIG. 15D is when the wavelength of the incident light is 612 nm.

FIGS. 17A to 17D show that regions where light absorption occurs in the pixel 130 are different depending on the wavelength of light incident on the pixel 130. This result may be extended to a case when four or more different wavelengths are incident on the pixel 130. As a result, FIGS. 17A to 17D suggests that the pixel 130 may separate wavelengths different from each other as many as the number of sub-pixels included in the pixel 130, and this result suggests that the vertically stacked type image sensor 120 may be used as a hyperspectral image sensor by appropriately selecting the number of sub-pixels of the vertically stacked structure constituting the pixel 130.

Figure 19:
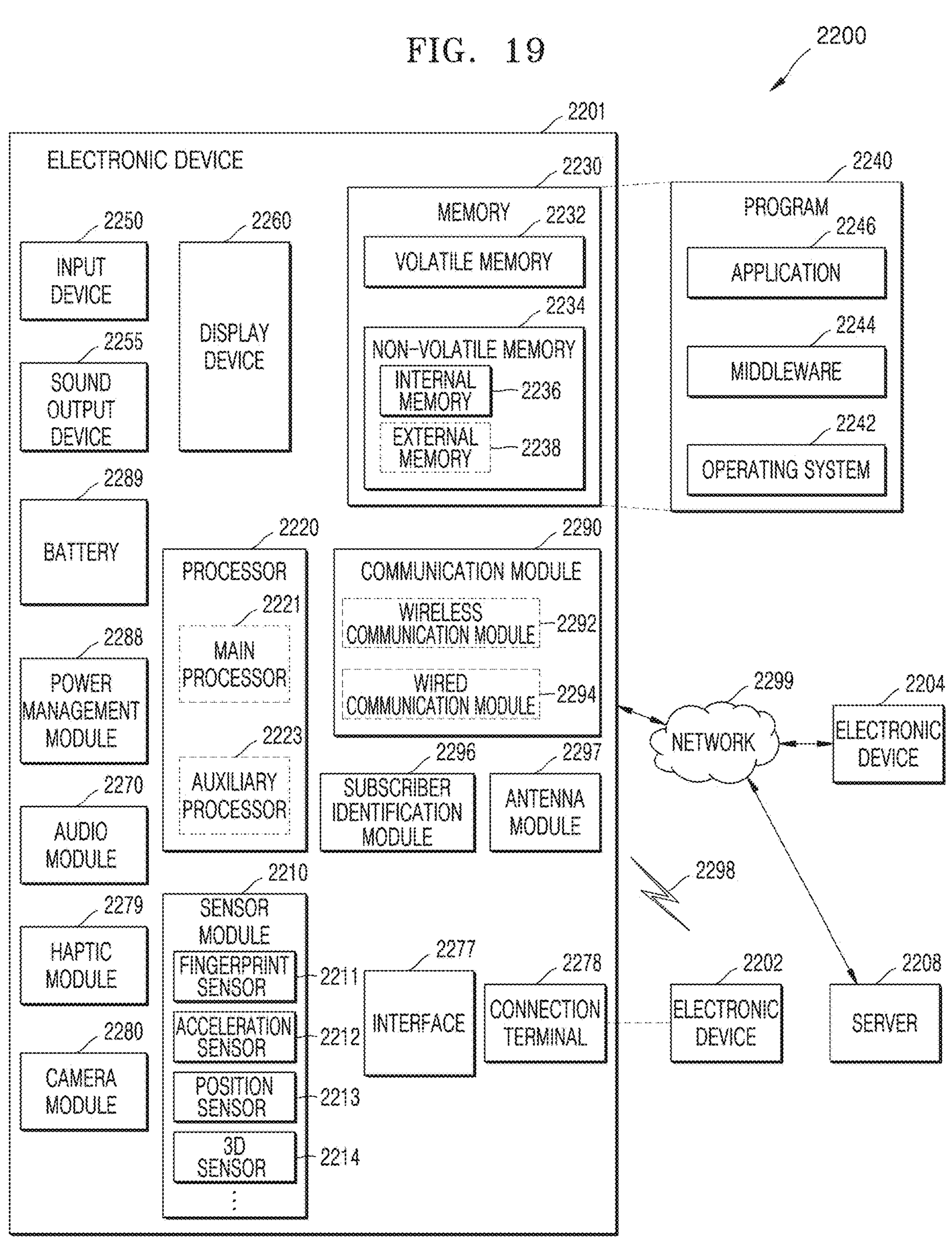
FIG. 19 is a block diagram illustrating an electronic device according to an example embodiment.

The vertical stacked type image sensor according to an example embodiment described above may be applied to various electronic devices, and FIG. 19 shows an example of the application.

Referring to FIG. 19, an electronic device 2201 in a network environment 2200 includes several devices and modules as shown.

One of the modules, a camera module 2280 may capture still images and moving images. For example, the camera module 2280 may include an imaging system including one of various image sensors that may be disclosed or suggested from FIGS. 1 to 18. For example, the camera module 2280 may include a window assembly, image sensors, image signal processors, and/or flashes. The window assembly included in the camera module 2280 may collect light emitted from an object that is an image capturing target. A power management module 2288 may manage power supplying to the electronic device 2201. The power management module 2288 may be implemented as part of a power management integrated circuit (PMIC).

A battery 2289 may supply power to components of the electronic device 2201. The battery 2289 may include a non-rechargeable primary cell, a rechargeable secondary cell, and/or a fuel cell.

The communication module 2290 establishes a direct (wired) communication channel and/or wireless communication channel between the electronic device 2201 and other electronic devices (the electronic device 2202, an electronic device 2204, server 2208, etc.) and performing communication through an established communication channel. The communication module 2290 may include one or more communication processors that operate independently of the processor 2220 (e.g., an application processor) and support direct communication and/or wireless communication. The communication module 2290 may include a wireless communication module 2292 (a cellular communication module, a short-range wireless communication module, a Global Navigation Satellite System (GNSS, etc.) communication module) and/or a wired communication module 2294 (a Local Area Network (LAN) communication module, or a power line communication module, etc.). Among these communication modules, a corresponding communication module may communicate with other electronic devices through the first network 2298 (a short-range communication network, such as Bluetooth, WiFi Direct, or Infrared Data Association (IrDA)) or the second network 2299 (a telecommunication network, such as a cellular network, the Internet, or a computer network (LAN) and WAN, etc.). The various types of communication modules may be integrated into one component (a single chip, etc.) or implemented as a plurality of components (plural chips) separate from each other. The wireless communication module 2292 may identify and authenticate the electronic device 2201 within a communication network, such as the first network 2298 and/or the second network 2299 by using subscriber information (such as, International Mobile Subscriber Identifier (IMSI)) stored in a subscriber identification module 2296.

The antenna module 2297 may transmit or receive signals and/or power to and from the outside (other electronic devices, etc.). The antenna may include a radiator having a conductive pattern formed on a substrate (PCB, etc.). The antenna module 2297 may include one or a plurality of antennas. When a plurality of antennas are included in the antenna module 2297, an antenna suitable for a communication method used in a communication network, such as the first network 2298 and/or the second network 2299 from among the plurality of antennas may be selected by the communication module 2290. Signals and/or power may be transmitted or received between the communication module 2290 and another electronic device through the selected antenna. In addition to the antenna, other components (an RFIC, etc.) may be included as a part of the antenna module 2297.

Some of the components are connected to each other through a communication method between peripheral devices (a bus, a general purpose input and output (GPIO), a serial peripheral interface (SPI), a mobile industry processor interface (MIPI), etc.), and may interchange signals (commands, data, etc.).

The command or data may be transmitted or received between the electronic device 2201 and the external electronic device 2204 through the server 2208 connected to the second network 2299. The other electronic devices 2202 and 2204 may be the same or different types of electronic device 2201. All or some of operations performed in the electronic device 2201 may be performed in one or more of the other electronic devices 2202 and 2204. For example, when the electronic device 2201 needs to perform a function or service, the electronic device 2201 may request one or more other electronic devices to perform part or all function or service instead of executing the function or service itself. One or more other electronic devices receiving the request may execute an additional function or service related to the request, and transmit a result of the execution to the electronic device 2201. For this purpose, cloud computing, distributed computing, and/or client-server computing technologies may be used.

For example, the electronic device 2201 may be included in a mobile phone, television (TV), robot, or the like.

Figure 20:
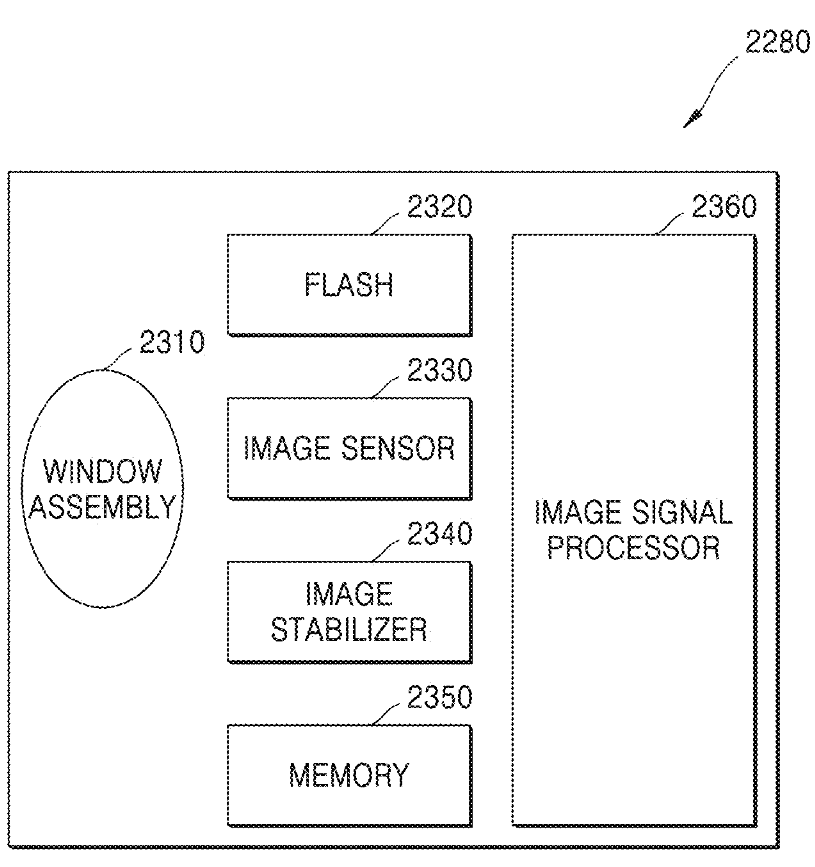
FIG. 20 is a block diagram showing a schematic configuration of a camera module included in the electronic device of FIG. 19.

FIG. 20 is a block diagram showing a schematic configuration of a camera module included in the electronic device 2201 of FIG. 19.

Referring to FIG. 20, the camera module 2280 may include a window assembly 2310, a flash 2320, an image sensor 2330, an image stabilizer 2340, a memory 2350 (a buffer memory, etc.), and/or an image signal processor 2360. The window assembly 2310 may collect light emitted from an object, which is an image capturing target, and may include a window layer, at least one coded mask layer, a filter layer, and an antireflection film.

The camera module 2280 may include a plurality of window assemblies 2310, and in this case, the camera module 2280 may be a dual camera, a 360° camera, or a spherical camera. Some of the plurality of window assemblies 2310 may have the same optical characteristics (angle of view, focal length, auto focus, F number, optical zoom, etc.) or may have different optical characteristics. The window assembly 2310 may include optical characteristics corresponding to a wide-angle lens or a telephoto lens.

The flash 2320 may emit light used to enhance light emitted or reflected from an object. The flash 2320 may include one or more light emitting diodes (Red-Green-Blue (RGB) LED, White LED, Infrared LED, Ultraviolet LED, etc.), and/or a Xenon Lamp. The image sensor 2330 may obtain an image corresponding to the object by converting light emitted or reflected from the object and transmitted through the window assembly 2310 into an electrical signal. For example, the image sensor 2330 may include one of various image sensors that may be disclosed or suggested from FIGS. 1 to 18.

The image stabilizer 2340 may respond to a movement of the camera module 2280 or the electronic device 2201 including the camera module 2280 to compensate for negative effects of the movement by moving the window assembly 2310 or the image sensor 2330 in a specific direction or by controlling (such as by adjusting read-out timing) the operation characteristic of the image sensor 2330. The image stabilizer 2340 may detect the movement of the camera module 2280 or the electronic device 2201 using a gyro sensor or an acceleration sensor disposed inside or outside the camera module 2280. The image stabilizer 2340 may be optically implemented.

The memory 2350 may store some or all data of an image acquired through the image sensor 2330 for a next image processing work. For example, when a plurality of images are acquired at high speed, the acquired original data (Bayer-patterned data, high-resolution data, etc.) is stored in the memory 2350, only low-resolution images are displayed, and then, original data of a selected image (by user selection, etc.) may be transmitted to the image signal processor 2360. The memory 2350 may be integrated into the memory 2230 of the electronic device 2201 or may be configured as a separate memory operated independently. The memory 2350 may also include a reconstruction algorithm for an image reconstruction task to be performed by the image signal processor 2360.

The image signal processor 2360 may perform one or more image processes on an image acquired through the image sensor 2330 or image data stored in the memory 2350. The processing of one or more images may include generation of depth map, 3D modeling, generation of panorama, extraction of feature point, image synthesis, image restoration, and/or image compensation (noise reduction, resolution adjustment, brightness adjustment, blurring), sharpening, softening, etc.). The image signal processor 2360 may perform control (exposure time control, read-out timing control, etc.) with respect to elements (the image sensor 2330, etc.) included in the camera module 2280. Images processed by the image signal processor 2360 may be stored again in the memory 2350 for further processing or may be stored in the external components (the memory 2230, the display device 2260, the electronic device 2202), the electronic device 2204, the server 2208, etc.) of the camera module 2280. The image signal processor 2360 may be integrated into the processor 2220 or may be configured as a separate processor that operates independently of the processor 2220. When the image signal processor 2360 is configured as a separate processor from the processor 2220, an image processed by the image signal processor 2360 undergoes additional image processing by the processor 2220, and then, may be displayed through the display device 2260.

The electronic device 2201 may include a plurality of camera modules 2280 having properties or functions different from each other. In this case, one of the plurality of camera modules 2280 may be a wide-angle camera and the other may be a telephoto camera. Similarly, one of the plurality of camera modules 2280 may be a front camera and the other may be a rear camera.

In the vertically stacked type image sensor according to an embodiment, each pixel includes a plurality of sub-pixels that are vertically stacked and have different radii. Because each of the plurality of sub-pixels is in the form of a nanorod or nanowire, each sub-pixel may generate an absorption resonance mode with respect to a specific wavelength. Accordingly, light incident on each pixel may be easily separated by wavelength. Because the wavelength separation is due to an absorption resonance mode according to a difference in radius of each sub-pixel, the wavelength separation effect may be higher than when only the conventional transmission characteristics are used.

In addition, the disclosed image sensor separates wavelengths using an absorption resonance mode, and a length of each sub-pixel may be freely adjusted within a given range. Accordingly, a signal generated from each sub-pixel may be greater than before.

In addition, because a plurality of sub-pixels (e.g., R, G, and B) are vertically stacked in each pixel of the disclosed image sensor, the pixel size may be reduced. Therefore, when the disclosed image sensor is used, it is possible to overcome a pixel limit of the related art and achieve high integration of the image sensor. According to high integration, more pixels may be formed in a small area, the resolution of the image sensor may also increase.

In addition, because the number of sub-pixels included in each pixel is not limited, the disclosed image sensor may be utilized as a hyperspectral image sensor by appropriately selecting the number of sub-pixels included in each pixel as the number necessary for acquiring a hyperspectral image. Even when the disclosed image sensor is used as a hyperspectral image sensor, the high integration and high resolution described above may be maintained.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A vertically stacked type image sensor comprising:

a plurality of pixels, each of the plurality of pixels comprising a plurality of sub-pixels stacked vertically and symmetrical with respect to a center line; and an insulating layer between two adjacent pixels and directly contacting a side surface of each of the plurality of sub-pixels included in each of the two adjacent pixels, wherein the plurality of sub-pixels have a layer structure that is configured to generate an absorption resonance at different wavelengths of light, and wherein the center line of each of the two adjacent pixels are inclined with respect to each other.

2. The vertically stacked type image sensor of claim 1, wherein the plurality of sub-pixels have different diameters from each other.

3. The vertically stacked type image sensor of claim 1, wherein the plurality of sub-pixels comprise:

a red sub-pixel configured to generate an absorption resonance with respect to a wavelength of red light;

a green sub-pixel configured to generate an absorption resonance with respect to a wavelength of green light; and a blue sub-pixel configured to generate an absorption resonance with respect to a wavelength of blue light, wherein the red sub-pixel, the green sub-pixel, and the blue sub-pixel are sequentially vertically stacked, and wherein a width of the red sub-pixel is greater than a width of the green sub-pixel, and the width of the green sub-pixel is greater than a width of the blue sub-pixel.

4. The vertically stacked type image sensor of claim 1, wherein the plurality of sub-pixels are stacked to form the layer structure in which diameters of the plurality of sub-pixels decrease vertically upward.

5. The vertically stacked type image sensor of claim 1, wherein heights of some sub-pixels of the plurality of sub-pixels are different from heights of the remaining sub-pixels of the plurality of sub-pixels.

6. The vertically stacked type image sensor of claim 1, wherein each sub-pixel of the plurality of sub-pixels comprises a P-type semiconductor layer and an N-type semiconductor layer vertically stacked.

7. The vertically stacked type image sensor of claim 6, further comprising a first electrode wiring connected to the P-type semiconductor layer and a second electrode wiring connected to the N-type semiconductor layer.

8. The vertically stacked type image sensor of claim 1, wherein the insulating layer and a height of any one sub-pixel selected from among the plurality of sub-pixels are configured to be in a complementary relationship with respect to light absorptivity of the selected one sub-pixel.

9. The vertically stacked type image sensor of claim 1, wherein the plurality of pixels are provided on a plane.

10. The vertically stacked type image sensor of claim 9, wherein the two adjacent pixels among the plurality of pixels are spaced apart by a first distance at which absorption resonances of the plurality of sub-pixels included in the two adjacent pixels is maintained.

11. The vertically stacked type image sensor of claim 1, wherein the plurality of pixels are provided on a curved surface.

12. The vertically stacked type image sensor of claim 11, wherein the curved surface is a Petzval surface.

13. The vertically stacked type image sensor of claim 1, wherein the plurality of sub-pixels comprise four or more sub-pixels.

14. The vertically stacked type image sensor of claim 13, wherein a number of sub-pixels included in the plurality of sub-pixels correspond to a number of sub-pixels required to obtain a hyperspectral image.

15. An electronic device comprising:

a vertically stacked type image sensor comprising:

a plurality of pixels, each of the plurality of pixels comprising a plurality of sub-pixels stacked vertically and symmetrical with respect to a center line; and an insulating layer between two adjacent pixels and directly contacting a side surface of each of the plurality of sub-pixels included in each of the two adjacent pixels, wherein the plurality of sub-pixels have a layer structure that is configured to generate an absorption resonance at different wavelengths of light, and wherein the center line of each of the two adjacent pixels are inclined with respect to each other.

16. The electronic device of claim 15, wherein the plurality of sub-pixels have different diameters from each other.

17. The electronic device of claim 15, wherein the plurality of sub-pixels comprise:

a red sub-pixel configured to generate an absorption resonance with respect to a wavelength of red light;

a green sub-pixel configured to generate an absorption resonance with respect to a wavelength of green light; and a blue sub-pixel configured to generate an absorption resonance with respect to a wavelength of blue light, wherein the red sub-pixel, the green sub-pixel, and the blue sub-pixel are sequentially vertically stacked, and wherein a width of the red sub-pixel is greater than a width of the green sub-pixel, and the width of the green sub-pixel is greater than a width of the blue sub-pixel.

18. The electronic device of claim 15, wherein the plurality of sub-pixels are stacked to form the layer structure in which diameters of the plurality of sub-pixels decrease vertically upward.

* * * * *